US008599764B2

(12) United States Patent
Vijayan et al.

(10) Patent No.: US 8,599,764 B2
(45) Date of Patent: Dec. 3, 2013

(54) TRANSMISSION OF OVERHEAD INFORMATION FOR RECEPTION OF MULTIPLE DATA STREAMS

(75) Inventors: Rajiv Vijayan, San Diego, CA (US); Kent Gordon Walker, San Diego, CA (US); Richard Doil Lane, San Diego, CA (US); Dhinakar Radhakrishnan, San Diego, CA (US); Ramaswamy Murali, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 994 days.

(21) Appl. No.: 10/968,702

(22) Filed: Oct. 18, 2004

(65) Prior Publication Data

US 2005/0141475 A1    Jun. 30, 2005
US 2013/0177010 A9    Jul. 11, 2013

Related U.S. Application Data

(63) Continuation-in-part of application No. 10/932,586, filed on Sep. 1, 2004, now Pat. No. 7,221,680.

(60) Provisional application No. 60/499,741, filed on Sep. 2, 2003, provisional application No. 60/559,740, filed on Apr. 5, 2004, provisional application No. 60/514,320, filed on Oct. 24, 2003.

(51) Int. Cl.
  *H04W 4/00*    (2009.01)

(52) U.S. Cl.
  USPC ........... 370/329; 370/336; 370/349; 370/468; 455/450; 455/464; 455/509

(58) Field of Classification Search
  USPC ................................. 370/329, 336, 347, 350
  See application file for complete search history.

(56) References Cited

U.S. PATENT DOCUMENTS 5,404,355 A * 4/1995 Raith .......................... 370/311
5,943,344 A   8/1999 Keller et al.
(Continued)

FOREIGN PATENT DOCUMENTS

CL   2710-2004   8/2005
CL   2714-2004   8/2005
(Continued)

OTHER PUBLICATIONS

Sparmann U. et al: "On the Effectiveness of Residue Code Checking for Parallel Two's Complement Multipliers" 1 IEEE Transactic NS On Very Large Scale Integration (VLSI) Systems, vol. 4, No. 2, Jun. 1, 1996, IEEE Service Center Piscataway, NJ, US, ISSN: 1063-8210.

(Continued)

*Primary Examiner* — Amancio Gonzalez
(74) *Attorney, Agent, or Firm* — Arent Fox LLP

(57) ABSTRACT

Techniques for transmitting overhead information to facilitate efficient reception of individual data streams are described. A base station may transmit multiple data streams on multiple data channels (or MLCs). The MLCs may be transmitted at different times and on different frequency sub-bands. The time-frequency location of each MLC may change over time. The overhead information indicates the time-frequency location of each MLC and may be sent as "composite" and "embedded" overhead information. The composite overhead information indicates the time-frequency locations of all MLCs and is sent periodically in each super-frame. A wireless device receives the composite overhead information, determines the time-frequency location of each MLC of interest, and receives each MLC at the indicated time-frequency location. The embedded overhead information for each MLC indicates the time-frequency location of that MLC in the next super-frame and is transmitted along with the payload of the MLC in the current super-frame.

222 Claims, 9 Drawing Sheets

(56) References Cited

U.S. PATENT DOCUMENTS

| | | | |
|---|---|---|---|
| 5,995,147 A | 11/1999 | Suzuki | |
| 6,088,326 A | 7/2000 | Lysejko et al. | |
| 6,424,678 B1 | 7/2002 | Doberstein et al. | |
| 6,515,960 B1 | 2/2003 | Usui | |
| 6,545,997 B1 | 4/2003 | Bohnke | |
| 6,563,881 B1 | 5/2003 | Sakoda | |
| 6,594,252 B1 | 7/2003 | Barany et al. | |
| 6,618,353 B2 | 9/2003 | Merrill et al. | |
| 6,721,267 B2 | 4/2004 | Hiben et al. | |
| 6,801,580 B2 | 10/2004 | Kadous | |
| 6,810,006 B2 | 10/2004 | Michon et al. | |
| 6,853,629 B2 | 2/2005 | Alamouti et al. | |
| 6,873,607 B1 * | 3/2005 | Hamada et al. | 370/321 |
| 6,947,408 B1 * | 9/2005 | Liberti et al. | 370/345 |
| 7,058,005 B2 | 6/2006 | Ehrmann-Patin et al. | |
| 7,110,349 B2 | 9/2006 | Branlund et al. | |
| 7,171,160 B2 | 1/2007 | Chuah et al. | |
| 7,197,022 B2 | 3/2007 | Stanwood et al. | |
| 7,221,680 B2 | 5/2007 | Vijayan et al. | |
| 7,317,680 B2 | 1/2008 | Ma et al. | |
| 7,366,462 B2 | 4/2008 | Murali | |
| 7,782,810 B2 | 8/2010 | Han | |
| 2001/0012322 A1 | 8/2001 | Nagaoka et al. | |
| 2002/0088005 A1 | 7/2002 | Wu et al. | |
| 2002/0105970 A1 | 8/2002 | Shvodian | |
| 2002/0136170 A1 | 9/2002 | Struhsaker | |
| 2002/0142780 A1 | 10/2002 | Airy | |
| 2002/0154705 A1 | 10/2002 | Walton et al. | |
| 2003/0043928 A1 | 3/2003 | Ling | |
| 2004/0136393 A1 | 7/2004 | Riveiro Insua et al. | |
| 2005/0088959 A1 | 4/2005 | Kadous | |
| 2005/0122928 A1 | 6/2005 | Vijayan | |
| 2005/0135308 A1 | 6/2005 | Vijayan et al. | |
| 2005/0174931 A1 | 8/2005 | Krishnamoorthi | |
| 2005/0249181 A1 | 11/2005 | Vijayan et al. | |
| 2006/0078001 A1 | 4/2006 | Chandra et al. | |
| 2006/0222108 A1 | 10/2006 | Cousineau | |
| 2008/0107192 A1 | 5/2008 | Mukkavilli et al. | |
| 2008/0186935 A1 | 8/2008 | Ling et al. | |
| 2008/0291860 A1 | 11/2008 | Vijayan et al. | |
| 2009/0175210 A1 | 7/2009 | Vijayan et al. | |

FOREIGN PATENT DOCUMENTS

| | | |
|---|---|---|
| CL | 2716-2004 | 8/2005 |
| CL | 2717-2004 | 8/2005 |
| CN | 1894876 | 1/2007 |
| CN | 1998212 A | 7/2007 |
| EP | 0829989 | 3/1998 |
| EP | 1041845 A1 | 10/2000 |
| EP | 1292061 | 3/2003 |
| EP | 1388954 | 2/2004 |
| JP | 09219692 | 8/1997 |
| JP | 10066039 A | 3/1998 |
| JP | 10503894 T | 4/1998 |
| JP | 10173624 A | 6/1998 |
| JP | 10191431 A | 7/1998 |
| JP | 2001223665 A | 8/2001 |
| JP | 2001308818 A | 11/2001 |
| JP | 2002111631 | 4/2002 |
| JP | 2002198929 | 7/2002 |
| JP | 2004531944 A | 10/2004 |
| JP | 2007525102 A | 8/2007 |
| KR | 20070048202 A | 5/2007 |
| RU | 2160508 | 12/2000 |
| TW | 510103 B | 11/2002 |
| TW | 531994 B | 5/2003 |
| TW | 550894 B | 9/2003 |
| WO | WO92010890 | 6/1992 |
| WO | 9852380 | 11/1998 |
| WO | WO9955030 A1 | 10/1999 |
| WO | WO0176110 | 10/2001 |
| WO | WO0182544 A2 | 11/2001 |
| WO | WO0189099 | 11/2001 |
| WO | 0209455 | 1/2002 |
| WO | WO0231991 A2 | 4/2002 |
| WO | 0249306 | 6/2002 |
| WO | 02087104 | 10/2002 |
| WO | WO2005022811 | 3/2005 |
| WO | WO2005041515 | 5/2005 |
| WO | WO2005043310 | 5/2005 |
| WO | WO2005043794 | 5/2005 |
| WO | WO2005043829 | 5/2005 |
| WO | WO2005043855 | 5/2005 |
| WO | 2005112378 | 11/2005 |
| WO | WO2005112566 | 12/2005 |
| WO | WO2005114940 A1 | 12/2005 |
| WO | WO2005122627 | 12/2005 |
| WO | WO2006015268 A2 | 2/2006 |
| WO | WO2006069316 | 6/2006 |
| WO | WO2006086878 | 8/2006 |
| WO | 2006099222 | 9/2006 |
| WO | WO2006099323 A1 | 9/2006 |
| WO | WO2006138206 A1 | 12/2006 |
| WO | WO2007014360 | 2/2007 |
| WO | WO2007050921 | 5/2007 |

OTHER PUBLICATIONS

Fujita, et al., "Basic Transmission Performance of BDMA system", Technical Report of IEICE, Japan, The Institute of Electronics, Information and Communication Engineers, Apr. 22, 1999, vol. 99, No. 19, pp. 7-12.

Supplementary European Search Report—EP04796065, Search Authority—Munich Patent Office, Jun. 29, 2010.

Translation of Office Action in Japanese application 2006-525457 corresponding to U.S. Appl. No. 12/180,305, citing JP2002111631, JP10066039, Fujita_et_al_vol_99_No_19_page_7_12_year_ 1992, WO02049306, WO02087104, J P10503894, J P2001223665, JP10173624A and JP09219692.Dated Jan. 11, 2011 (030568JP).

"Taiwan Search Report—TW093132299—TIPO—May 7, 2011 (040024TW)".

K. Takamura et al, "Field Trial Results of a Band Hopping OFDM System", 1999, pp. 310-314.

International Search Report—PCT/US04/035005, International Search Authority—US, Aug. 30, 2006.

Written Opinion—PCT/US04/035005, International Search Authority—US, Aug. 30, 2006.

International Preliminary Report on Patentability—PCT/US04/035005, IPEA/US, Sep. 25, 2007.

* cited by examiner

TRANSMISSION OF OVERHEAD INFORMATION FOR RECEPTION OF MULTIPLE DATA STREAMS

CROSS-REFERENCE TO RELATED APPLICATIONS

The present Application for Patent claims priority to and is a continuation-in-part of U.S. application Ser. No. 10/932,586, filed Sep. 1, 2004, now U.S. Pat. No. 7,221,680, entitled "Multiplexing and Transmission of Multiple Data Streams in a Wireless Multi-Carrier Communication System," which is assigned to the assignee hereof. U.S. application Ser. No. 10/932,586, claims priority to U.S. Provisional Application No. 60/499,741, filed Sep. 2, 2003, entitled "Method for Multiplexing and Transmitting Multiple Multimedia Streams to Mobile Terminals over Terrestrial Radio Links," and U.S. Provisional Application No. 60/559,740, filed Apr. 5, 2004, entitled "Multiplexing and Transmission of Multiple Data Streams in a Wireless Multi-Carrier Communication System." The present Application for Patent claims priority, through U.S. application Ser. No. 10/932,586, to U.S. Provisional Application No. 60/499,741, and also claims priority to U.S. Provisional Application No. 60/559,740, identified above, and U.S. Provisional Application No. 60/514,320, filed Oct. 24, 2003, entitled "Method for Adding Overhead Information to Receive Multiple Multimedia Streams over Mobile Wireless Radio Links," which are assigned to the assignee hereof and hereby expressly incorporated by reference herein.

BACKGROUND

I. Field

The present invention relates generally to communication, and more specifically to techniques for transmitting overhead information for reception of multiple data streams in a communication system.

II. Background

A base station in a wireless communication system may simultaneously transmit multiple data streams for broadcast, multicast, and/or unicast services. A broadcast transmission is sent to all wireless devices within a designated coverage area, a multicast transmission is sent to a group of wireless devices, and a unicast transmission is sent to a specific wireless device. For example, the base station may broadcast a number of data streams for multimedia (e.g., television) programs via a terrestrial radio link for reception by wireless devices. In general, the base station may transmit any number of data streams, which may change over time, and each data stream may have a fixed or variable data rate.

A wireless device within the coverage area of the base station may be interested in receiving only one or few specific data streams among the multiple data streams transmitted by the base station. If the base station multiplexes all data streams onto one composite stream prior to transmission, then the wireless device may need to receive the signal transmitted by the base station, process (e.g., downconvert, demodulate, and decode) the received signal to obtain the composite stream sent by the base station, and perform demultiplexing to extract the one or few specific data streams of interest. This type of processing may not be problematic for receiver units intended to be powered on all the time. However, many wireless devices are portable and powered by internal batteries. Continual demodulation and decoding of the received signal to recover just one or few data streams of interest may consume significant amounts of battery power, which may greatly shorten the "ON" time for the wireless device.

If the multiple data streams are transmitted separately, then the base station may also transmit control information on a dedicated control channel to indicate when and where each data stream will be transmitted. In this case, the wireless device may need to continuously decode the dedicated control channel to obtain control information for each data stream of interest, which can deplete battery power. The wireless device may also need to simultaneously decode each data stream of interest along with the dedicated control channel, which can increase the complexity of the wireless device.

There is therefore a need in the art for techniques to send overhead information such that individual data streams of interest to wireless devices may be efficiently received with reduced power consumption.

SUMMARY

Techniques for transmitting overhead information to facilitate efficient reception of individual data streams are described herein. A base station may transmit multiple data streams on multiple data channels. A data channel is also called a multiplexed logical channel (MLC) in the following description but may also be referred to by some other terminology. Each MLC may carry one or more data streams and may be transmitted at different times, on different frequency subbands, and so on. The time-frequency location of each MLC may change over time. The overhead information indicates the time-frequency location where each MLC is transmitted. The overhead information for all of the MLCs may be sent in two parts called "composite" overhead information and "embedded" overhead information.

In an embodiment, the composite overhead information includes location information for all MLCs and is sent periodically at the start of each super-frame of a predetermined time duration, as described below. The composite overhead information for each super-frame contains location information for each MLC for that super-frame, and this location information indicates the time-frequency location where the MLC will be transmitted in the super-frame. A wireless device may receive the composite overhead information for a current super-frame, determine the time-frequency location of each MLC of interest based on the location information for the MLC, and receive each MLC of interest in the current super-frame at the indicated time-frequency location. The periodic and known transmission of the composite overhead information allows the wireless devices in the system to rapidly acquire each MLC of interest, decode each desired MLC with minimal "ON" time, and quickly switch between MLCs.

The composite overhead information may be partitioned into a wide-area portion and a local-area portion. The wide-area portion may contain location information for all MLCs with a wide coverage area (e.g., nationwide). The local-area portion may contain location information for all MLCs with a local coverage area (e.g., citywide). The wide-area and local-area portions may be processed differently by both the base station and the wireless devices for robust reception performance.

In an embodiment, the embedded overhead information for each MLC in each super-frame contains location information for that MLC for a future (e.g., next) super-frame and is transmitted along with the payload of the MLC in the current super-frame. A wireless device receiving a given MLC can obtain the embedded overhead information for that MLC as part of the processing for the MLC in the current super-frame.

The wireless device may then use this information to receive the MLC in the next super-frame, without having to "wake up" and receive the composite overhead information sent in the next super-frame.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for transmitting overhead information may be used for wireless and wireline communication systems, for time division multiplexed (TDM), frequency division multiplexed (FDM), and code division multiplexed (CDM) systems, for single-input single-output (SISO) and multiple-input multiple-output (MIMO) systems, for single-carrier and multi-carrier systems, and so on. Multiple carriers may be provided by orthogonal frequency division multiplexing (OFDM), some other multi-carrier modulation techniques, or some other construct. OFDM effectively partitions the overall system bandwidth into multiple (N) orthogonal subbands. These subbands are also referred to as tones, carriers, subcarriers, bins, and frequency channels. With OFDM, each subband is associated with a respective subcarrier that may be modulated with data. The techniques described herein may also be used for broadcast, multicast, and unicast services. For clarity, these techniques are described below for an exemplary wireless multi-carrier broadcast system.

Figure 1:
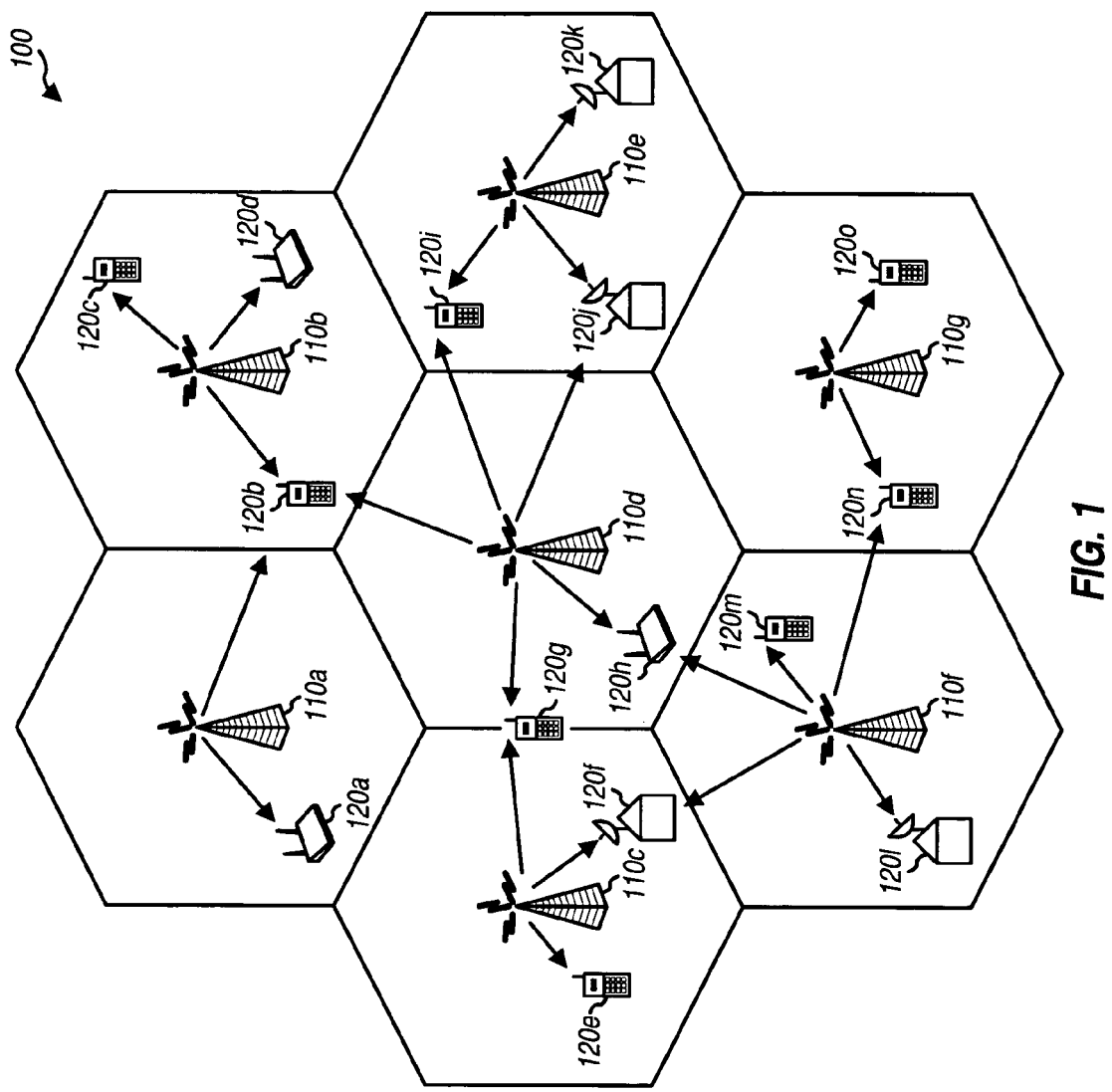
FIG. 1 shows a wireless multi-carrier broadcast system.

FIG. 1 shows a wireless multi-carrier broadcast system 100. System 100 includes a number of base stations 110 that are distributed throughout the system. A base station is generally a fixed station and may also be called an access point, a transmitter, or some other terminology. Wireless devices 120 are located throughout the coverage area of the system. A wireless device may be fixed or mobile and may also be called a user terminal, a mobile station, user equipment, or some other terminology. A wireless device may also be a portable unit such as a cellular phone, a handheld device, a wireless module, a personal digital assistant (PDA), and so on.

Each base station may transmit wide-area content, local-area content, or a combination of both. Wide-area content is content sent over a large coverage area (e.g., nationwide), and local-area content is content sent over a smaller coverage area (e.g., citywide). Neighboring base stations may transmit the same or different contents. Each base station may also transmit multiple data streams for wide-area and/or local-area contents to wireless devices within its coverage area. These data streams may carry multimedia content such as video, audio, teletext, data, video/audio clips, and so on. The data streams are sent on data channels or MLCs.

In a specific embodiment that is described in detail below, each MLC may carry up to three data streams, e.g., one data stream for signaling and up to two data streams for packet/traffic data. Each multimedia program may be sent as one or more data streams, e.g., different data streams for different multimedia contents such as video, audio, data, and so on. The one or more data streams for each multimedia program may be sent on one or more MLCs. For example, one MLC may carry two data streams for a given program—one data stream for real-time content and another data stream for a video clip to be played along with the real-time content at designated times. As another example, two MLCs may carry three data streams for a single multimedia (e.g., television) program—one MLC may carry one data stream for video and another data stream for data, and a second MLC may carry one data stream for audio. Transmitting the video and audio portions of the program on separate MLCs allows the wireless devices to independently receive the video and audio. In general, each MLC may carry any number of data streams, and each multimedia program may be sent in any number of data streams and on any number of MLCs.

Figure 2:
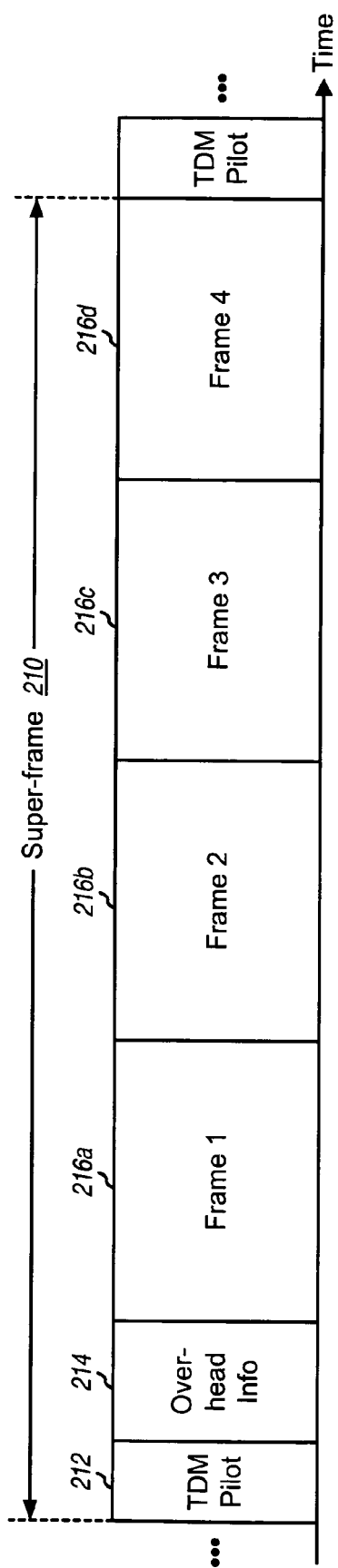
FIG. 2 shows an exemplary super-frame structure.

FIG. 2 shows an exemplary super-frame structure that may be used for system 100. Data transmission occurs in units of super-frames 210. Each super-frame spans a predetermined time duration, which may be selected based on various factors such as, for example, the desired statistical multiplexing for the data streams, the amount of time diversity desired for the data streams, the acquisition time for the data streams, buffer requirements for the wireless devices, and so on. A super-frame size of approximately one second may provide a good tradeoff between the various factors noted above. However, other super-frame sizes may also be used. A super-frame may also be called a frame, a time slot, or some other terminology.

For the embodiment shown in FIG. 2, each super-frame includes a field 212 for a TDM pilot, a field 214 for overhead information, and four equal-sized frames 216a through 216d. The TDM pilot may be used by the wireless devices for synchronization (e.g., frame detection, frequency error estimation, timing acquisition, and so on) and possibly for channel estimation. The overhead information indicates the specific location of each data channel within the super-frame and may be sent as described below. The data streams are multiplexed and sent in the four frames.

FIG. 2 shows a specific super-frame structure. In general, a super-frame may span any time duration, include any number and any type of fields, and have any number of frames. The system may also use other frame structures for transmission.

In an embodiment, the protocol stack for the system includes upper layers that reside on top of a stream layer, which resides on top of a medium access control (MAC) layer, which further resides on top of a physical layer. The upper layers control transmission of multimedia contents, access to the contents, and so on. The stream layer provides binding of upper layers packets to data streams on an MLC-by-MLC basis. The MAC layer performs multiplexing of packets for different data streams associated with each MLC. The physical layer provides a mechanism to transmit the multiple data streams via a communication channel.

Figure 3:
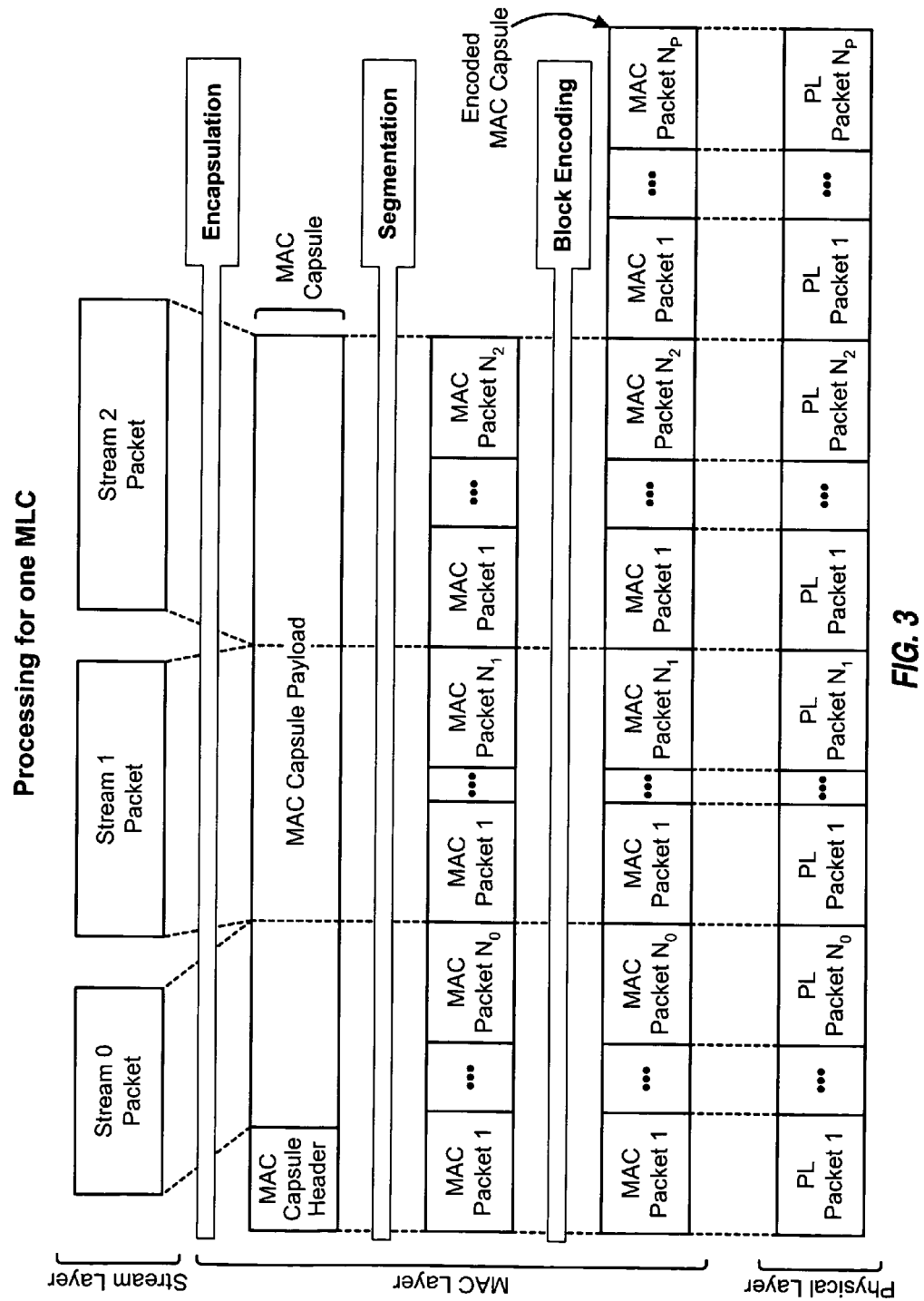
FIG. 3 shows exemplary packet processing for one MLC.

FIG. 3 shows an embodiment of the packet formats used for the stream layer, the MAC layer, and the physical layer. FIG. 3 also shows the processing for one MLC in one super-frame. The MLC may carry up to three data streams, which are designated as streams 0, 1, and 2. Stream 0 may be used to send signaling for the MLC, and streams 1 and 2 may be used to send different multimedia contents (e.g., video, audio, datacast, multicast, and so on). The signaling may be for various items such as, e.g., a decryption key used to decrypt the other data streams being sent on the MLC. (The decryption key may be decrypted by a wireless device having a proper subscription key, which may be obtained upon activation of a service.) Other types of signaling may also be sent on stream 0. For example, stream 0 may carry a presentation record that defines the characteristics of the media carried by the MLC, the location of the same MLC in the next super-frame, text components and/or media, and so on. In general, each stream may carry more than one type of media, although it may be more convenient to carry a single media type in each stream. For each super-frame, the stream layer provides one stream layer packet for each data stream sent on the MLC in that super-frame. For clarity, the following description assumes that three data streams are being sent on the MLC.

The MAC layer forms a MAC capsule for the MLC for each super-frame in which the MLC is transmitted. The MAC capsule includes a MAC capsule header and a MAC capsule payload. The MAC capsule header carries embedded overhead information for the MLC, which may be used to receive the MLC in a future (e.g., the next) super-frame. The MAC capsule payload carries the stream layer packets to be sent in the current super-frame for the data streams carried by the MLC. The MAC layer forms $N_0$ MAC layer packets (or simply, MAC packets) for the MAC capsule header and stream 0 packet, $N_1$ MAC packets for stream 1 packet, and $N_2$ MAC packets for stream 2 packet, where $N_0 \geq 1$, $N_1 \geq 1$, and $N_2 \geq 1$ if all three data streams are being sent. To facilitate independent reception of the data streams, each stream layer packet is sent in an integer number of MAC packets, and the length of each stream layer packet is included in the overhead information. The MAC layer also performs block encoding on the $(N_1+N_1+N_2)$ MAC packets for the MLC and generates $N_p$ parity MAC packets, where $N_p \geq 0$ and is dependent on whether or not block encoding is enabled and, if enabled, the block encoding mode selected for the MLC. For each super-frame in which the MLC is transmitted, the MAC layer provides an encoded MAC capsule that contains $(N_0+N_1+N_2+N_p)$ data and parity MAC packets.

The physical layer receives the encoded MAC capsule and processes (e.g., encodes, interleaves, and symbol maps) each MAC packet to generate a corresponding physical layer (PL) packet. In an embodiment, the MAC packets are of a fixed size (e.g., approximately 1K bytes), the PL packets for the MLC are of equal size, and the PL packet size is determined by the code rate and modulation scheme used for the MLC. The one-to-one mapping between MAC packets and PL packets simplifies the processing at the base station and wireless devices.

Data may be transmitted in various manners in system 100. In an embodiment, M slots are formed in each symbol period and are mapped to M disjoint or non-overlapping sets of subbands, where $M \geq 1$. To obtain frequency diversity, the subbands in each set may be uniformly distributed across the N total subbands in the system. The subbands in each set are then interlaced with the subbands in each of the other M−1 sets. Each subband set may thus be called an "interlace". Each slot may be mapped to different interlaces in different symbol periods (e.g., based on a predetermined mapping scheme) to improve frequency diversity and obtain other benefits. For clarity, the following description is for data transmission in slots, and the slot-to-interlace mapping is not described.

For a given super-frame structure, a fixed number of slots is available for transmission in each super-frame. Some of the available slots may be used to transmit an FDM pilot, which may be used by the wireless devices for channel estimation and other purposes. Some slots may also be allocated for a control channel used to transmit signaling for the MLCs, as described below. The remaining slots are then available for allocation to the MLCs.

Each MLC may be "allocated" a fixed or variable number of slots in each super-frame depending on the MLC's payload, the availability of slots in the super-frame, and possibly other factors. Each "inactive" MLC, which is an MLC that is not transmitted in a given super-frame, is allocated zero slots. Each "active" MLC, which is an MLC to be transmitted in a given super-frame, is allocated at least one slot. Each active MLC is also "assigned" specific slots within the super-frame based on an assignment scheme that attempts to (1) pack the slots for all active MLCs as efficiently as possible, (2) reduce the transmission time for each MLC, (3) provide adequate time-diversity for each MLC, and (4) minimize the amount of signaling needed to indicate the slots assigned to each MLC. Various schemes may be used to assign slots to MLCs. In general, there is a tradeoff between time diversity and power savings. The system may provide flexibility to allow power consumption to be favored over time diversity, or vice versa, for different MLCs. For example, some MLCs may be optimized for time diversity while other MLCs may be optimized for power consumption. MLCs containing many turbo code blocks inherently achieve more time diversity, while lower data rate MLCs can benefit from additional time diversity.

Figure 4:
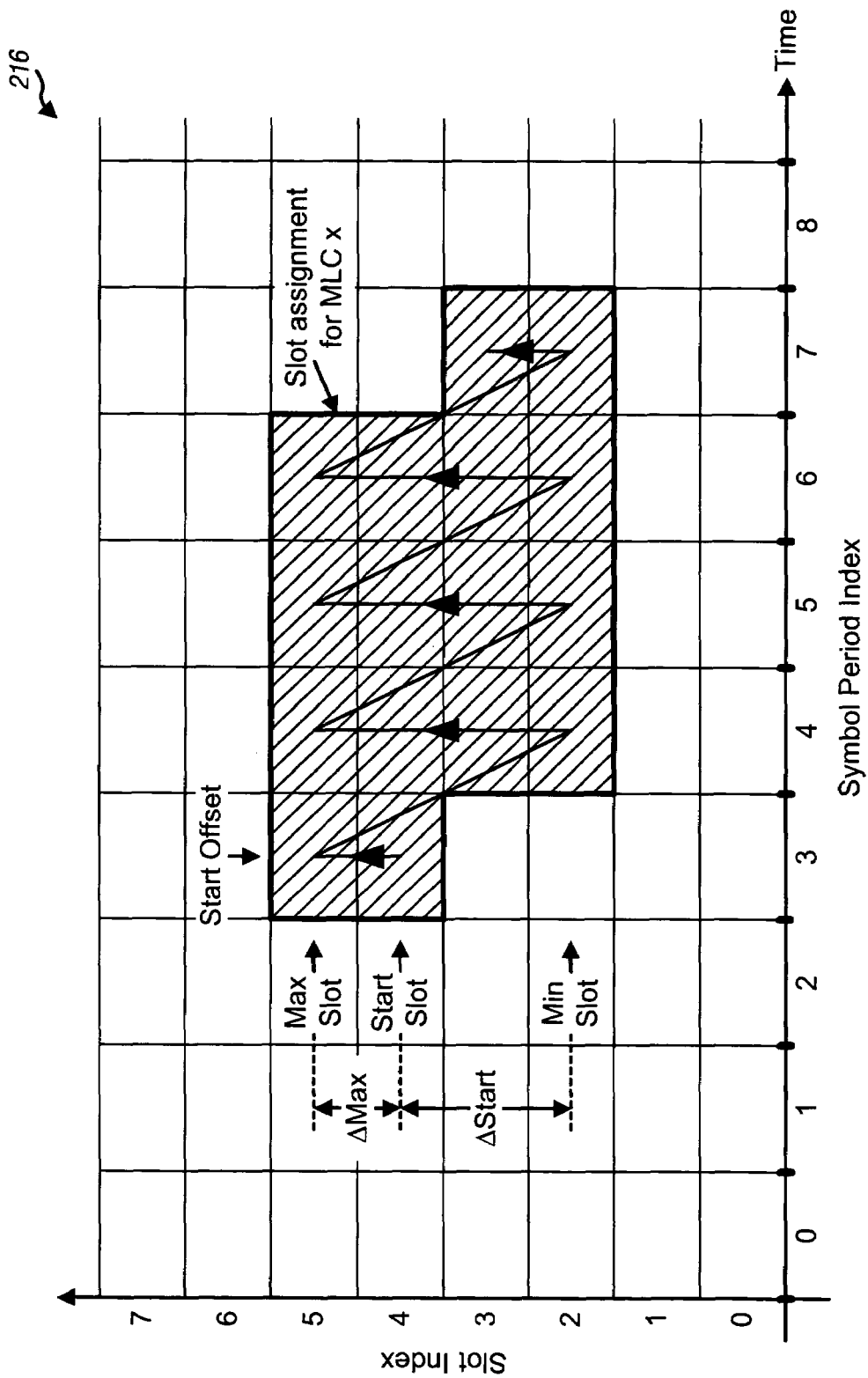
FIG. 4 shows assignment of slots to an MLC using a "zig-zag" pattern.

FIG. 4 shows an exemplary slot assignment scheme that assigns slots to MLCs using a "sinusoidal" or "zigzag" pattern. For this scheme, a frame is divided into one or more "strips", and each strip spans at least one slot index and further spans a contiguous number of (e.g., all) symbol periods in the frame. Each active MLC is mapped to one strip and is assigned slots in that strip. The slots in each strip may be assigned to the MLCs mapped to that strip in a specific order using a vertical zigzag pattern. This zigzag pattern selects slots from the lowest slot index for the strip to the highest slot index for the strip, one symbol period at a time, starting with the first symbol period for the strip.

FIG. 4 also shows the assignment of slots to a given MLC x for one frame 216. MLC x is assigned slots starting from a start slot index (Start Slot) at a designated symbol period index (Start Offset) and going to a highest slot index (Max Slot), then starting from a lowest slot index (Min Slot) in the next symbol period index and going to the highest slot index, and so on, until the number of slots allocated to MLC x has been reached. For the example shown in FIG. 4, MLC x is assigned 16 slots starting at slot index 4 in symbol period index 3, zigzaging between the lowest slot index 2 and the highest slot index 5, and concluding at slot index 3 in symbol period index 7.

An exemplary slot assignment scheme has been described above. The MLCs may also be assigned slots in other manners using other schemes. For example, each MLC may be assigned slots in a rectangular pattern on the two-dimensional (2-D) plane for slot versus symbol period, as shown in FIG. 4. The active MLCs may be assigned rectangular patterns such that these patterns are packed as efficiently as possible in the frame.

The slots assigned to each active MLC for each super-frame may be conveyed in the location information sent for the MLC. The parameters used to describe the slots assigned to each active MLC are typically dependent on the scheme used to assign the slots. For example, if each active MLC is assigned a rectangular pattern, then this pattern may be described by two corners, e.g., the slot index and symbol period index for the lower left corner of the pattern and the slot index and symbol period index for the upper right corner of the pattern. If each active MLC is assigned slots using the zigzag pattern, then the assigned slots for the MLC may be described by the Start Slot, the Min Slot, the Max Slot, and the number of slots allocated to the MLC, as shown in FIG. 4.

Figure 5:
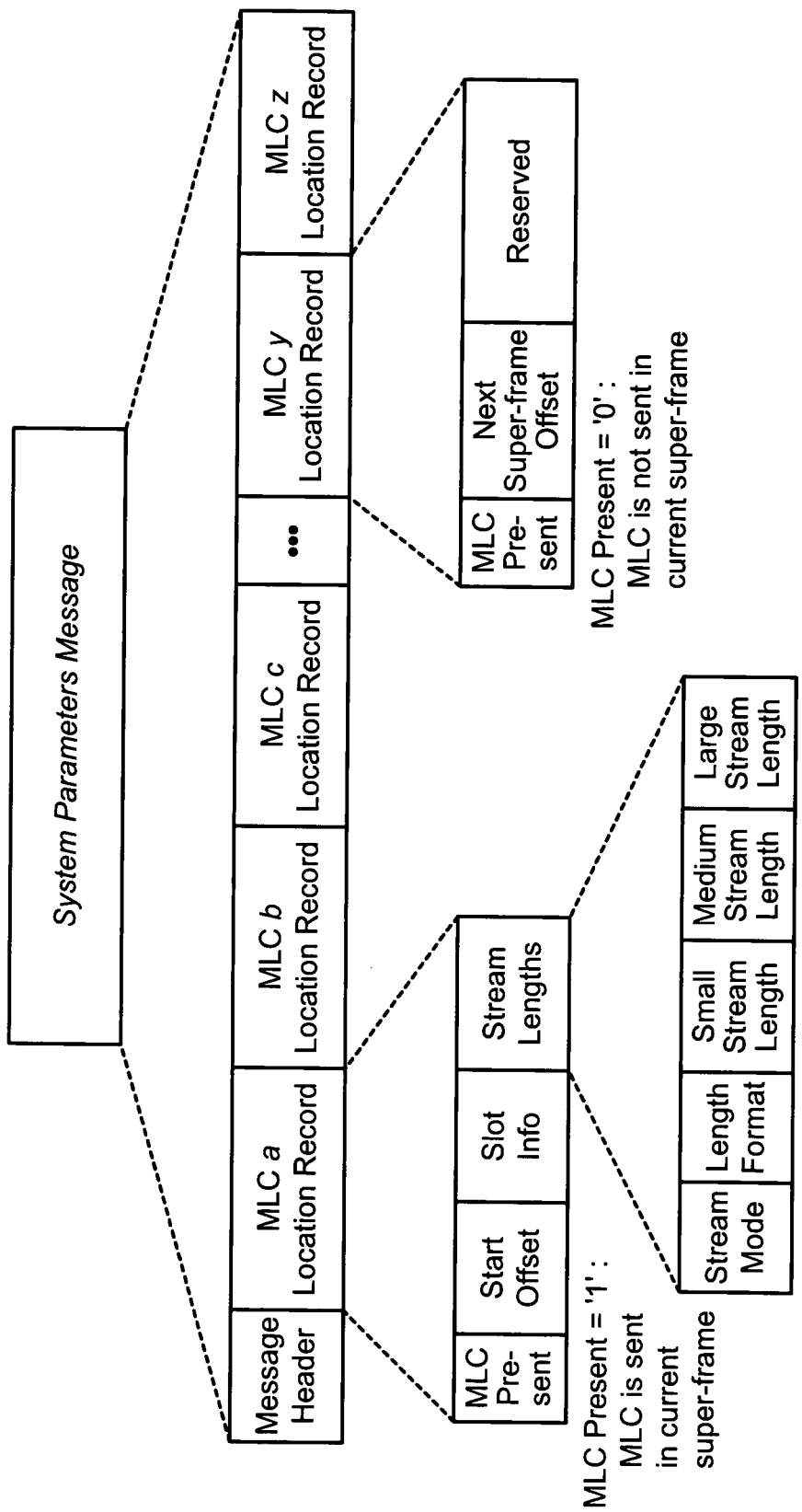
FIG. 5 shows an exemplary message for carrying location information for multiple MLCs.

FIG. 5 shows an embodiment of a System Parameters Message used to carry location information for the MLCs. In general, the location information for each MLC includes all parameters used to describe the time-frequency location for the MLC, e.g., the specific slots assigned to the MLC. For the embodiment shown in FIG. 5, the System Parameters Message contains a message header and one or more location records. The message header may carry information such as, for example, (1) the system time for the beginning of the current super-frame, (2) a network identifier, (3) the source of the message, (4) a protocol version supported by the system, (5) transmission parameters for a control channel (described below), (6) the MLC for the first location record sent in the message right after the header, (7) the number of location records ($N_{rec}$) being sent in the message, and so on. In general, the message header may contain any pertinent information for the wireless devices.

The message carries $N_{rec}$ location records for $N_{rec}$ MLCs after the message header, one location record for each MLC, where $N_{rec} \geq 1$. In an embodiment, each location record has a fixed length or size of L bits, and the $N_{rec}$ location records are sent in sequential order based on the identifiers (IDs) for the MLCs. For example, if the first location record is for MLC x, then the second location record is for MLC x+1, the third location record is for MLC x+2, and so on, and the last location record is for MLC $x+N_{rec}-1$. This allows the wireless devices to quickly find and extract the location record for each MLC of interest.

For the embodiment shown in FIG. 5, each location record contains an MLC Present bit that is set to '1' if the associated MLC is being sent in the current super-frame and is set to '0' otherwise. If the MLC Present bit is set to '1', then the location record carries a Start Offset field, a Slot Info field, and a Stream Lengths field. The Start Offset field indicates the first or starting symbol period index for the slots assigned to the MLC. The Slot Info field contains slot information, which conveys all parameters used to describe the assigned slots (e.g., the Min Slot, Start Slot, and Max Slot). The Stream Lengths field carries the length of each stream layer packet carried by the MLC in the current super-frame (e.g., $N_0$, $N_1$, and $N_2$ for the three stream layer packets in FIG. 3). The number of slots allocated to the MLC may be determined based on the stream lengths and the transmission parameters (e.g., the code rate and modulation scheme) used for the MLC. If the MLC Present bit is set to '0', then the location record carries a Next Super-frame Offset field and a Reserved field. The Next Super-frame Offset field indicates the next super-frame in which the MLC may be sent. If this field is set to '0', then the MLC may be sent in any upcoming super-frame. If this field is set to a non-zero value, then this value indicates the minimum number of super-frames from the next super-frame where the MLC may continue. For example, if the Next Super-frame Offset field is set to four, then the MLC will not be sent until at least five super-frames from the current super-frame. The wireless devices may start searching for the next occurrence of the MLC starting at this future super-frame. Table 1 summarizes the various fields of the location record for one MLC.

TABLE 1

| MLC Present = '1' (active MLC) | |
|---|---|
| Start Offset | Indicate the starting symbol period index for the slots assigned to the MLC. |
| Slot Info | Contain parameters describing the slots assigned to the MLC. |
| Stream Lengths | Contain the length of each stream layer packet carried by the MLC in the current super-frame. |
| MLC Present = '0' (inactive MLC) | |
| Next Super-frame Offset | Indicate the next super-frame in which the MLC may be sent. |
| Reserved | Padding to make the location record a fixed size. |

The slot information may be encoded to reduce the number of bits needed to convey this information. An exemplary encoding scheme for the slot information is described below. This encoding scheme is for slot assignment using the zigzag pattern shown in FIG. 4 and further assumes that the lowest slot index for any MLC is 1 and the highest slot index is 7. Slot index 0 may be used for the FDM pilot, the control channel, and so on. With the above assumption, the lowest slot index (Min Slot), the starting slot index (Start Slot), and the highest slot index (Max Slot) for any MLC are related as follows:

$$1 \leq \text{Min Slot} \leq \text{Start Slot} \leq \text{Max Slot} \leq 7. \quad \text{Eq (1)}$$

The delta or difference between the starting and lowest slot indices and the delta between the highest and starting slot indices may be computed as follows:

$$\Delta\text{Start} = \text{Start Slot} - \text{Min Slot and} \quad \text{Eq (2)}$$

$$\Delta\text{Max} = \text{Max Slot} - \text{Start Slot}. \quad \text{Eq (3)}$$

The slot information for each MLC may be given by a slot information code value (Slot Info Code) that is determined based on the Min Slot, ΔStart, and ΔMax for that MLC. Table 2 shows an exemplary mapping of Min Slot, ΔStart, and ΔMax to Slot Info Code.

TABLE 2

| Min Slot | ΔStart | ΔMax | Slot Info Code |
|---|---|---|---|
| 1 | 0 | 0 | 0 |
| 1 | 0 | 1 | 1 |
| 1 | 0 | 2 | 2 |
| 1 | 0 | 3 | 3 |
| 1 | 0 | 4 | 4 |
| 1 | 0 | 5 | 5 |
| 1 | 0 | 6 | 6 |
| 1 | 1 | 0 | 7 |
| 1 | 1 | 1 | 8 |
| 1 | 1 | 2 | 9 |
| 1 | 1 | 3 | 10 |
| 1 | 1 | 4 | 11 |
| 1 | 1 | 5 | 12 |
| 1 | 2 | 0 | 13 |
| 1 | 2 | 1 | 14 |
| 1 | 2 | 2 | 15 |
| 1 | 2 | 3 | 16 |
| 1 | 2 | 4 | 17 |
| 1 | 3 | 0 | 18 |
| 1 | 3 | 1 | 19 |
| 1 | 3 | 2 | 20 |

TABLE 2-continued

| Min Slot | ΔStart | ΔMax | Slot Info Code |
|---|---|---|---|
| 1 | 3 | 3 | 21 |
| 1 | 4 | 0 | 22 |
| 1 | 4 | 1 | 23 |
| 1 | 4 | 2 | 24 |
| 1 | 5 | 0 | 25 |
| 1 | 5 | 1 | 26 |
| 1 | 6 | 0 | 27 |
| 2 | 0 | 0 | 28 |
| 2 | 0 | 1 | 29 |
| 2 | 0 | 2 | 30 |
| 2 | 0 | 3 | 31 |
| 2 | 0 | 4 | 32 |
| 2 | 0 | 5 | 33 |
| 2 | 1 | 0 | 34 |
| 2 | 1 | 1 | 35 |
| 2 | 1 | 2 | 36 |
| 2 | 1 | 3 | 37 |
| 2 | 1 | 4 | 38 |
| 2 | 2 | 0 | 39 |
| 2 | 2 | 1 | 40 |
| 2 | 2 | 2 | 41 |
| 2 | 2 | 3 | 42 |
| 2 | 3 | 0 | 43 |
| 2 | 3 | 1 | 44 |
| 2 | 3 | 2 | 45 |
| 2 | 4 | 0 | 46 |
| 2 | 4 | 1 | 47 |
| 2 | 5 | 0 | 48 |
| 3 | 0 | 0 | 49 |
| 3 | 0 | 1 | 50 |
| 3 | 0 | 2 | 51 |
| 3 | 0 | 3 | 52 |
| 3 | 0 | 4 | 53 |
| 3 | 1 | 0 | 54 |
| 3 | 1 | 1 | 55 |
| 3 | 1 | 2 | 56 |
| 3 | 1 | 3 | 57 |
| 3 | 2 | 0 | 58 |
| 3 | 2 | 1 | 59 |
| 3 | 2 | 2 | 60 |
| 3 | 3 | 0 | 61 |
| 3 | 3 | 1 | 62 |
| 3 | 4 | 0 | 63 |
| 4 | 0 | 0 | 64 |
| 4 | 0 | 1 | 65 |
| 4 | 0 | 2 | 66 |
| 4 | 0 | 3 | 67 |
| 4 | 1 | 0 | 68 |
| 4 | 1 | 1 | 69 |
| 4 | 1 | 2 | 70 |
| 4 | 2 | 0 | 71 |
| 4 | 2 | 1 | 72 |
| 4 | 3 | 0 | 73 |
| 5 | 0 | 0 | 74 |
| 5 | 0 | 1 | 75 |
| 5 | 0 | 2 | 76 |
| 5 | 1 | 0 | 77 |
| 5 | 1 | 1 | 78 |
| 5 | 2 | 0 | 79 |
| 6 | 0 | 0 | 80 |
| 6 | 0 | 1 | 81 |
| 6 | 1 | 0 | 82 |
| 7 | 0 | 0 | 83 |

If the maximum slot index is 7, then the parameters Min Slot, Start Slot, and Max Slot may each be conveyed with 3 bits, and the slot information for each MLC may be conveyed with 9 bits for the three parameters. The Slot Info Code may be conveyed with 7 bits for the 84 possible code values shown in Table 2. The encoding scheme described above thus reduces the number of bits needed to convey the slot information for each MLC.

The stream layer packet lengths may also be encoded to reduce the number of bits needed to convey this information. An exemplary encoding scheme for the stream layer packet lengths is described below. This encoding scheme is for the packet formats shown in FIG. 3 and further assumes that (1) up to three stream layer packets may be sent in any MLC in a super-frame and (2) the three stream layer packets have small, medium, and large sizes.

For the embodiment shown in FIG. 5, the Stream Lengths field contains a Stream Mode subfield, a Length Format subfield, a Small Stream Length subfield, a Medium Stream Length subfield, and a Large Stream Length subfield. The Stream Mode subfield is set to '0' to indicate that two stream layer packets are sent in the MLC and is set to '1' to indicate that three stream layer packets are sent in the MLC. The Length Format subfield indicates the sizes of the stream layer packets for the up to three data streams sent on the MLC. Table 3 shows an exemplary definition of the Length Format subfield for different stream layer packet sizes for the three data streams.

TABLE 3

| Length Format | Stream 0 | Stream 1 | Stream 2 |
|---|---|---|---|
| Mode = '0' (two stream layer packets) | | | |
| '000' | Not Sent | Medium | Large |
| '001' | Not Sent | Large | Medium |
| '010' | Medium | Not Sent | Large |
| '011' | Medium | Large | Not Sent |
| '100' | Large | Not Sent | Medium |
| '101' | Large | Medium | Not Sent |
| '110' | Not Sent | Not Sent | Large |
| '111' | Not Sent | Large | Not Sent |
| Mode = '1' (three stream layer packets) | | | |
| '000' | Small | Medium | Large |
| '001' | Small | Large | Medium |
| '010' | Medium | Small | Large |
| '011' | Medium | Large | Small |
| '100' | Large | Small | Medium |
| '101' | Large | Medium | Small |
| '110' | | Reserved | |
| '111' | | Reserved | |

For the embodiment shown in Table 3, one data stream carried by the MLC is designated as a "large" stream, one data stream is designated as a "medium" stream, and a third data stream (if sent) is designated as a "small" stream. The stream layer packets for the large, medium, and small streams may carry up to $N_{large}$, $N_{medium}$, and $N_{small}$ MAC packets, respectively. The Large Stream Length subfield indicates the length of the stream layer packet for the large stream sent on the MLC and contains $B_{large}$ bits, where $B_{large} = \log_2 (N_{large})$. The Medium Stream Length subfield indicates the stream layer packet length for the medium stream sent on the MLC and contains $B_{medium}$ bits, where $B_{medium} = \log_2(N_{medium})$. The Small Stream Length subfield indicates the stream layer packet length for the small stream (if any) sent on the MLC and contains $B_{small}$ bits, where $B_{small} = \log_2 (N_{small})$.

FIG. 5 shows the case in which three data streams are sent on the MLC, and three subfields are used to indicate the lengths of the stream layer packets for these three data streams. If only two data streams are sent on the MLC, then the $B_{small}$ bits for the small stream may be used for the medium or large stream (not shown in FIG. 5).

If each data stream sent in the MLC can carry up to 1024 MAC packets in each super-frame, then a 10-bit stream length subfield may be used for each data stream. In this case, 30 bits may be used to convey the stream layer packet lengths for the three data streams carried in the MLC. However, if the three data streams have different lengths and if the large, medium, and small streams can carry up to 1024, 256, and 2 MAC packets, respectively, then $B_{large}=10$, $B_{medium}=8$, and $B_{small}=1$ bits may be used for the three streams. If one bit is used for the Stream Mode subfield and three bits are used for the Length Format subfield, then a total of 23 bits may be used to convey the stream layer packet lengths for the three data streams carried by the MLC. The encoding scheme described above can thus reduce the number of bits needed to convey the stream lengths for each MLC.

A specific encoding scheme for slot information and a specific encoding scheme for stream lengths have been described above. Other encoding schemes may also be used, e.g., for different slot assignment schemes, different packet formats, and so on. Different encoding schemes may achieve different number of bit savings. In any case, the bit savings achieved with encoding may be significant for a large number of MLCs. Since overhead information is sent periodically and since overhead bits are relatively expensive, it is desirable to minimize the number of overhead bits as much as possible for greater efficiency.

Figure 6:
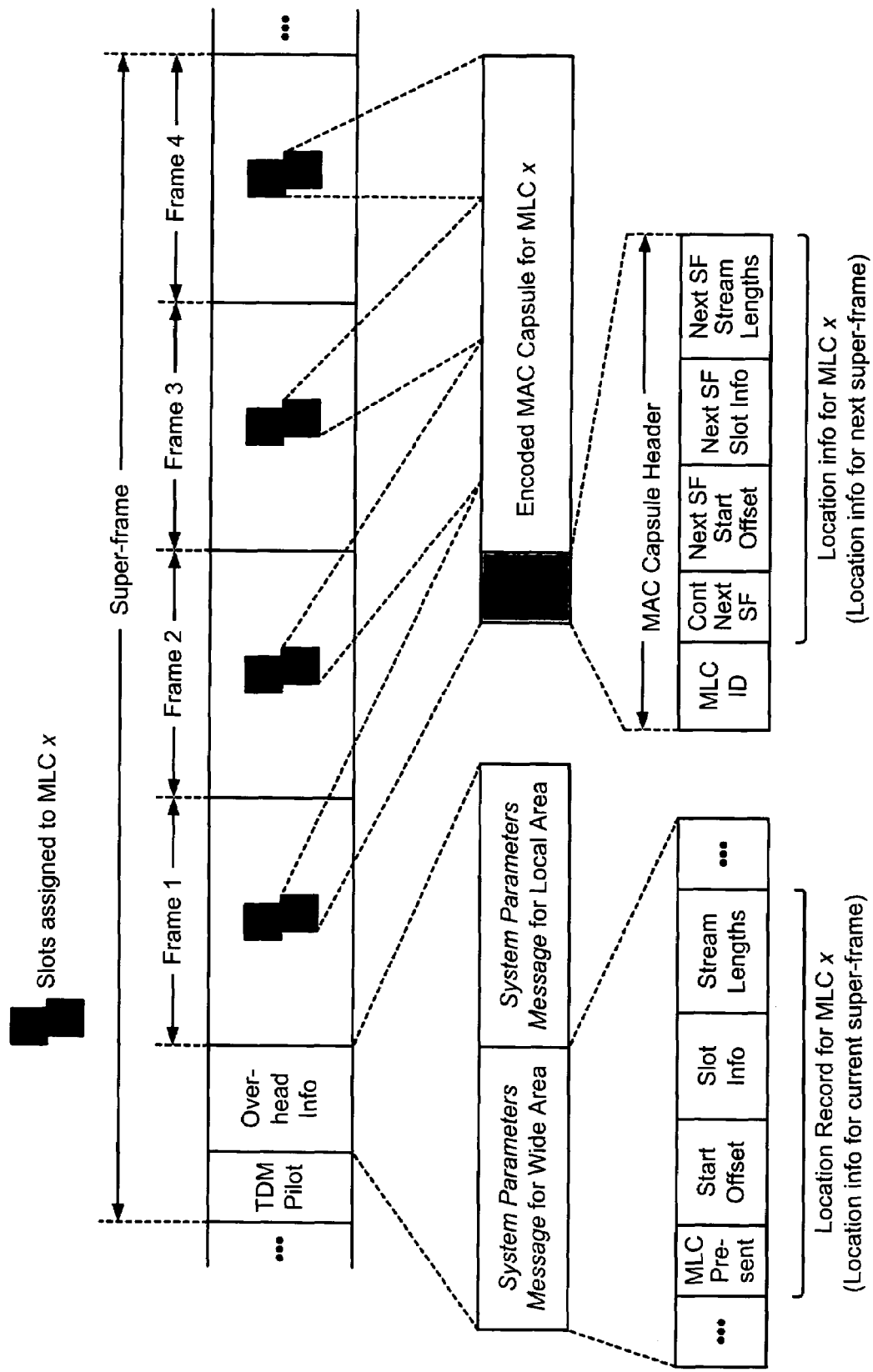
FIG. 6 shows transmission of composite and embedded overhead information.

FIG. 6 shows an embodiment for transmitting composite and embedded overhead information in a manner to facilitate efficient reception of the data streams. The composite overhead information is sent at the start of each super-frame in a TDM manner and contains location information for all MLCs. For example, one System Parameters Message may contain location information for all MLCs carrying wide-area content, and another System Parameters Message may contain location information for all MLCs carrying local-area content. The System Parameters Message for each coverage type (wide-area or local-area) contains one location record for each MLC carrying content of that coverage type. Each location record in each System Parameters Message contains location information (e.g., start offset, slot information, and stream lengths) for the associated MLC for the current super-frame, if the MLC is active.

An encoded MAC capsule is transmitted in the current super-frame for each active MLC. In an embodiment, the encoded MAC capsule is partitioned into four equal-sized portions, and each portion is further processed and transmitted in one frame on the slots assigned to the MLC. The transmission of the encoded MAC capsule over four frames provides time diversity and robust reception performance in a slowly time-varying fading channel. For each MLC, the same slot assignment may be used for the four frames of the super-frame, as shown in FIG. 6, and this slot assignment is conveyed in the location record for that MLC.

In an embodiment, the MAC capsule header for the MAC capsule for each MLC x contains location information for MLC x for the next super-frame, if the MLC will be transmitted in that super-frame. For the embodiment shown in FIG. 6, the MAC capsule header contains an MLC ID field and a Cont Next SF field. The MLC ID field carries the ID of MLC x. The Cont Next SF field is set to '1' if MLC x will be transmitted in the next super-frame and is set to '0' otherwise. If MLC x is transmitted in the next super-frame, then the MAC capsule header further contains a Next SF Start Offset field, a Next SF Slot Info field, and a Next SF Stream Lengths field, which carry the same type of information as the Start Offset, Slot Info, and Stream Lengths fields, respectively, in the location record. However, the Start Offset, Slot Info, and Stream Lengths fields in the location record carry "current" overhead information for MLC x for the current super-frame. The Next SF Start Offset, Next SF Slot Info, and Next SF Stream Lengths fields in the MAC capsule header carry "future" overhead information for MLC x for the next super-frame. In an embodiment, if MLC x is not transmitted in the next super-frame, then the MAC capsule header further contains a Next Super-frame Offset field and a Reserved field (not shown in FIG. 6), which carry the same type of information as the Next Super-frame Offset field and the Reserved field, respectively, in the location record. In another embodiment, if MLC x is not transmitted in the next super-frame, then the MAC capsule header carries the location information (e.g., Next SF Start Offset field, Next SF Slot Info field, and Next SF Stream Lengths field) for MLC x for the next super-frame in which MLC x will be transmitted.

As shown in FIG. 6, a wireless device that has just powered on or has just switched to a new MLC may receive the composite overhead information sent at the start of each super-frame and determine the location where the new MLC will be sent in the current super-frame. The wireless device may then receive the MAC capsule for this new MLC at the location indicated by the location record for the MLC. The wireless device may obtain from the MAC capsule header the embedded overhead information for this MLC for the next super-frame. The wireless device may then use this embedded overhead information to receive the MLC in the next super-frame, without having to process the composite overhead information sent at the start of the next super-frame. If the MLC is transmitted continuously in each super-frame, which is often the case for a multimedia program, then the wireless device may need to receive the composite overhead information only once. The wireless device may thereafter obtain the embedded overhead information for the MLC for each future super-frame from the MAC capsule header. In this way, the wireless device may be turned "ON" for a shorter time duration and may be able to conserve more battery power. The MLC ID is used to ensure that the wireless device is processing the MAC capsule for the proper MLC, e.g., in case the MLC is decoded in error.

Figure 7:
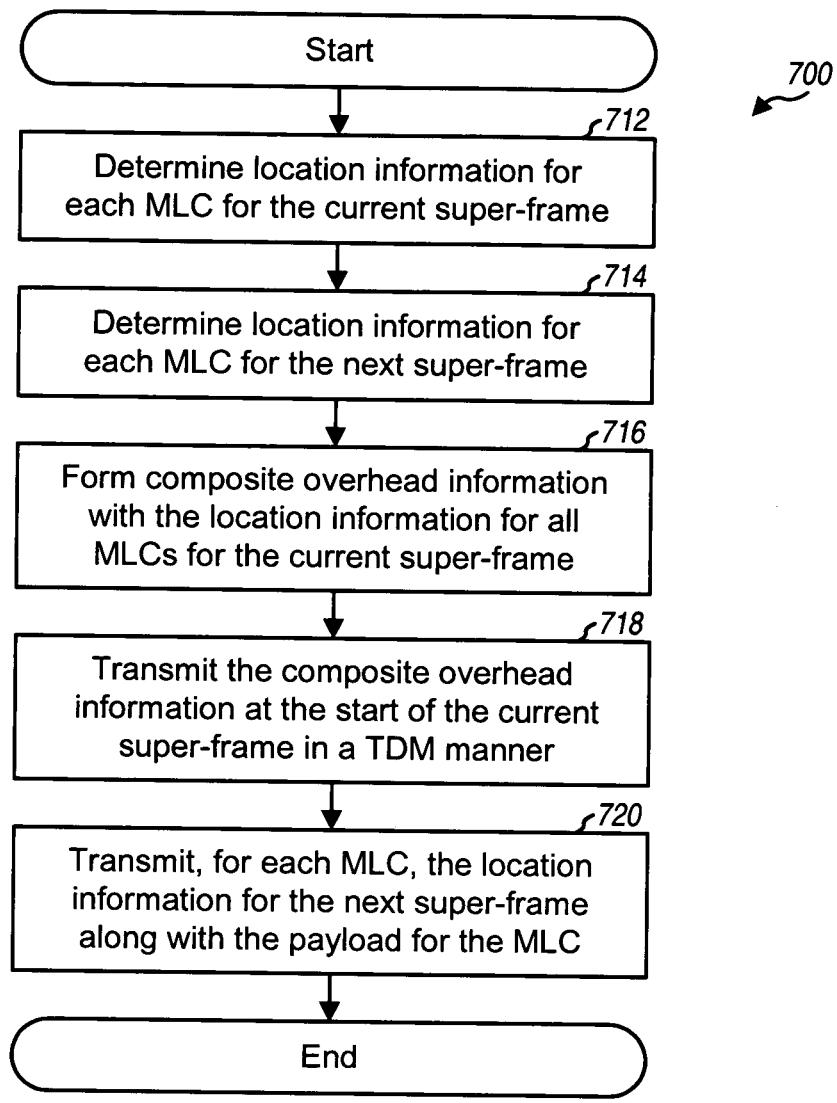
FIG. 7 shows a process for transmitting overhead information.

FIG. 7 shows a process 700 for transmitting overhead information for multiple data channels or MLCs. The location information for each MLC for the current super-frame is determined (e.g., block 712). The location information for each MLC indicates the time-frequency location for the MLC and may have the format shown in FIG. 5 or some other format. The location information for each MLC for a future (e.g., next) super-frame is also determined (e.g., block 714). Composite overhead information for the current super-frame is formed with the location information for all MLCs for the current super-frame (block 716) and is transmitted at the start of the current super-frame in a TDM manner (block 718). The location information for each MLC for the future super-frame is transmitted along with the payload for the MLC in the current super-frame (block 720).

For the embodiments described above, the overhead information is sent in two parts. The composite overhead information is sent periodically at the start of each super-frame (which may be relatively infrequently, e.g., once every second) and conveys the slot assignments for all MLCs sent in that super-frame. A wireless device may use the composite overhead information if it is requesting content for the first time (e.g., after powering on), if an MLC of interest was decoded in error in a previous super-frame, if the wireless device is receiving a new MLC, if the wireless device switches reception from a current MLC to a new MLC, and so on.

A wireless device may use the embedded overhead information to determine when to wake up in the next super-frame. If the wireless device has successfully decoded an MLC of interest in the current super-frame, then the wireless device does not need to wake up to receive the composite overhead information sent in the next super-frame. This reduces the ON time for the wireless device to receive data streams. The embedded overhead information is thus a power-efficient way to provide the location where the MLC will be sent in the next super-frame. The wireless device can obtain this embedded overhead information as part of the processing for the MLC. If each MLC carries embedded overhead information only for itself and no other MLCs, as described above, then the embedded overhead information only needs to point to a single location in the next super-frame for this MLC. The embedded overhead information is protected by the same error-correction coding used for the payload of the MLC, which ensures robust reception of the embedded overhead information.

The super-frame duration may be selected such that the composite and embedded overhead information consumes a relatively small percentage of the total system capacity while still allowing for fast changes between data channels. The partitioning of the composite overhead information into wide-area and local-area portions also provides several benefits. The overhead data bits for the wide-area portion may be sent in a manner to obtain the benefits of using OFDM in a single-frequency network (SFN). For example, a wireless device may receive and combine the overhead data bits from multiple base stations to obtain greater reception reliability. The overhead data bits for the local-area portion may be transmitted differently than those for the wide-area portion, e.g., using a different OFDM pilot structure, a lower code rate, a lower order modulation scheme, and so on, in order to improve reception of these bits at the boundaries of the local coverage areas. In general, the wide-area and local-area portions may be processed with the same or different coding and modulation schemes, may have the same or different formats and lengths, and so on. The overhead information is processed and transmitted to be as robust as the traffic data.

The location information for each MLC may be sent once to allow the wireless devices to receive the MLC. The location information for all MLCs may be sent in the composite overhead information at the start of each super-frame. The location information for each active MLC may also be sent redundantly along with the payload for the MLC to improve efficiency in receiving the MLC. However, this redundant location information is optional and may be omitted (i.e., not transmitted).

The overhead information for the data channels may also be sent in other manners. For example, the stream lengths may be included in the MAC capsule header instead of the location record. If the MLCs are scheduled more than one super-frame in advance, then the location record and/or MAC capsule header may also include location information for a super-frame that is further out than the next super-frame. The MAC capsule header may include a bit to indicate whether the location information for the next super-frame is the same as for the current super-frame, in which case the location information may be omitted from the MAC capsule header.

The overhead information indicates the location where each MLC is transmitted. A control channel may be used to carry other pertinent information for the MLCs. For example, the control channel may carry, for each MLC, the code rate and modulation scheme used for the MLC, the block coding used for the MLC, the type of media being sent on each data stream carried by the MLC, the upper layer entity that is bound to each data stream carried by the MLC, and so on. The control channel may be sent in a manner that is known a priori by the wireless devices, which may then be able to receive the control without other signaling.

Figure 8:
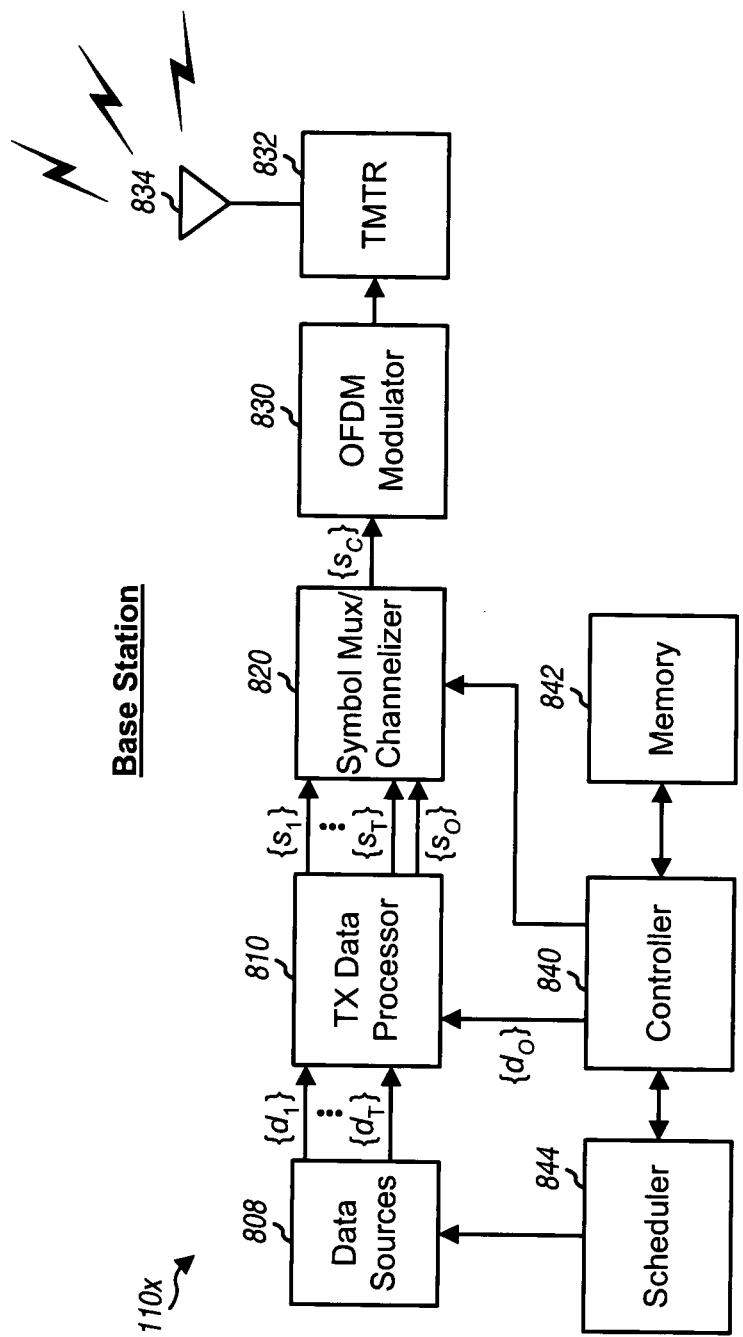
FIG. 8 shows a block diagram of a base station.

FIG. 8 shows a block diagram of a base station 110x, which is one of the base stations in system 100. At base station 110x, a transmit (TX) data processor 810 receives multiple (T) data streams (denoted as $\{d_1\}$ through $\{d_T\}$) from data sources 808, where T≥1. Each data stream may carry one stream layer packet for each super-frame in which the data stream will be sent (e.g., as shown in FIG. 3). TX data processor 810 also receives embedded overhead data for each MLC and appends the overhead data onto a proper stream layer packet being sent on the MLC (e.g., as shown in FIG. 3). TX data processor 810 processes each data stream in accordance with a "mode" used for that stream to generate a corresponding data symbol stream. The mode for each data stream may indicate, for example, the code rate, the modulation scheme, and so on, to use for the data stream. TX data processor 810 provides T data symbol streams (denoted as $\{s_1\}$ through $\{s_T\}$) to a symbol multiplexer (Mux)/channelizer 820. As used herein, a data symbol is a modulation symbol for packet/traffic data, an overhead symbol is a modulation symbol for overhead data, a pilot symbol is a modulation symbol for pilot (which is data that is known a priori by both the base station and wireless devices), a guard symbol is a signal value of zero, and a modulation symbol is a complex value for a point in a signal constellation used for a modulation scheme (e.g., M-PSK, M-QAM, and so on).

TX data processor 810 also receives composite overhead data to be sent at the start of each super-frame (which is denoted as $\{d_O\}$) from a controller 840. TX data processor 810 processes the composite overhead data in accordance with a mode used for the overhead data and provides an overhead symbol stream (denoted as $\{s_O\}$) to channelizer 820. The composite overhead data may be partitioned into a wide-area portion and a local-area portion (as shown in FIG. 6) and processed separately, e.g., based on the same or different modes. The mode(s) used for the composite overhead data are typically associated with a lower code rate and/or a lower order modulation scheme than those used for the data streams to ensure robust reception of the composite overhead data in time-selective and/or frequency-selective terrestrial radio channels.

Channelizer 820 multiplexes the data symbols in the T data symbol streams onto their assigned slots. Channelizer 820 also provides pilot symbols on slots used for pilot transmission and guard symbols on subbands not used for transmission. Channelizer 820 further multiplexes pilot symbols and overhead symbols in the pilot and overhead fields at the start of each super-frame, as shown in FIG. 2. Channelizer 820 provides a composite symbol stream (denoted as $\{S_C\}$) that carries data, overhead, pilot, and guard symbols on the proper subbands and symbol periods. An OFDM modulator 830 performs OFDM modulation on the composite symbol stream and provides a stream of OFDM symbols to a transmitter unit (TMTR) 832. Transmitter unit 832 conditions (e.g., converts to analog, filters, amplifies, and frequency upconverts) the OFDM symbol stream and generates a modulated signal that is transmitted from an antenna 834.

Controller 840 directs operation at base station 110x. A memory unit 842 provides storage for program codes and data used by controller 840. Controller 840 and/or a scheduler 844 allocate and assign slots to the active MLCs.

Figure 9:
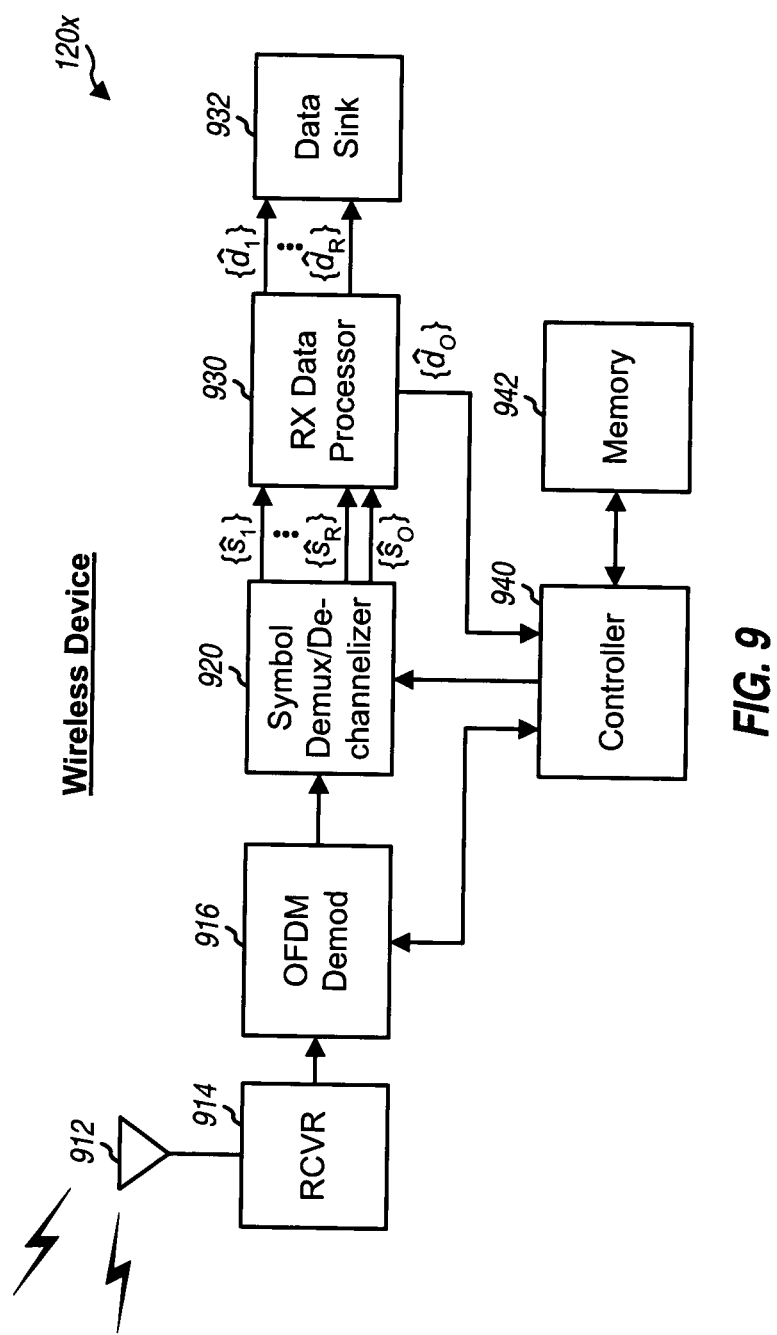
FIG. 9 shows a block diagram of a wireless device.

FIG. 9 shows a block diagram of a wireless device 120x, which is one of the wireless devices in system 100. An antenna 912 receives the modulated signal transmitted by base station 110x and provides a received signal to a receiver unit (RCVR) 914. Receiver unit 914 conditions, digitizes, and processes the received signal and provides a sample stream to an OFDM demodulator 916. OFDM demodulator 916 performs OFDM demodulation on the sample stream to obtain received pilot symbols and received data and overhead symbols. A controller 940 derives a channel response estimate for the radio link between base station 110x and wireless device 120x based on the received pilot symbols. OFDM demodulator 916 further performs coherent detection (e.g., equalization or matched filtering) on the received data and overhead symbols with the channel response estimate and provides to a symbol demultiplexer (Demux)/dechannelizer 920 "detected" data and overhead symbols, which are estimates of the transmitted data and overhead symbols, respectively.

Controller 940 obtains an indication of (e.g., user selection for) one or more MLCs to be received by the wireless device. Controller 940 then determines the slot assignment for each selected MLC based on either (1) the composite overhead information sent at the start of the current super-frame or (2) the embedded overhead information sent in the MAC capsule header received in a previous super-frame for the MLC. Controller 940 then provides a control signal to dechannelizer 920. Dechannelizer 920 performs demultiplexing of the detected data and overhead symbols for each symbol period based on the control signal and provides one or more detected data symbol streams and/or a detected overhead symbol stream to RX data processor 930. RX data processor 930 processes (e.g., symbol demaps, deinterleaves, and decodes) the detected overhead symbol stream in accordance with the mode used for the composite overhead data and provides decoded overhead data to controller 940. RX data processor 930 also processes each detected data symbol stream for each MLC of interest, in accordance with the mode used for that stream, and provides a corresponding decoded data stream to a data sink 932. In general, the processing at wireless device 120x is complementary to the processing at base station 110x.

Controller 940 also directs operation at wireless device 120x. A memory unit 942 provides storage for program codes and data used by controller 940.

The techniques described herein for transmitting overhead information may be implemented by various means. For example, these techniques may be implemented in hardware, software, or a combination thereof. For a hardware implementation, the processing units at a base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at a wireless device may also be implemented within one or more ASICs, DSPs, and so on.

For a software implementation, the techniques described herein may be implemented with modules (e.g., procedures, functions, and so on) that perform the functions described herein. The software codes may be stored in a memory unit (e.g., memory unit 842 and/or 942) and executed by a processor (e.g., controller 840 and/or 940). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting overhead information in a communication system, comprising:
   determining location information for each of a plurality of data channels in super frames operating on a plurality of frequency bands, the location information for each data channel indicating time location, frequency location, or both time and frequency location where the data channel is transmitted;
   generating composite overhead information, the composite overhead information including the location information for each of the plurality of data channels in a current superframe;
   generating embedded overhead information for each of the plurality of data channels, the embedded overhead information including location information for each of the plurality of data channels in a future super-frame;
   transmitting the composite overhead information at the start of the current super-frame in a time division multiplexed (TDM) manner with data for the plurality of data channels; and
   transmitting the embedded overhead information with a payload for the corresponding data channel in the current super-frame.

2. The method of claim 1, further comprising:
   transmitting at least one data stream on each of the plurality of data channels.

3. The method of claim 2, wherein the location information for each data channel indicates the number of data streams transmitted on the data channel.

4. The method of claim 2, wherein the location information for each data channel indicates size of each data stream being transmitted on the data channel.

5. The method of claim 1, further comprising:
   transmitting the plurality of data channels in super-frames, each super-frame having a predetermined time duration, and wherein the transmitting the overhead information in a TDM manner comprises transmitting the overhead information in each super-frame in a TDM manner with the data for the plurality of data channels.

6. The method of claim 5, wherein the overhead information transmitted in each super-frame comprises location information for the plurality of data channels for the super-frame.

7. The method of claim 5, wherein the determining the location information for each of the plurality of data channels comprises generating location information for each data channel for a current super-frame to indicate whether or not the data channel is transmitted in the current super-frame.

8. The method of claim 5, wherein the determining the location information for each of the plurality of data channels comprises for each data channel transmitted in a current super-frame, generating location information for the data channel to indicate a starting time in which the data channel is transmitted in the current super-frame.

9. The method of claim 5, wherein the determining the location information for each of the plurality of data channels comprises for each data channel not transmitted in a current super-frame, generating location information for the data channel to indicate a next earliest super-frame in which the data channel is potentially transmitted.

10. The method of claim 5, wherein the determining the location information for each of the plurality of data channels further comprises generating location information for each data channel for a current super-frame to indicate a length of each data packet being sent on the data channel in the current super-frame.

11. The method of claim 1, further comprising:
transmitting the plurality of data channels in a plurality of slots, each slot being associated with a respective set of frequency sub bands.

12. The method of claim 11, wherein the plurality of slots are assigned a plurality of slot indices, and wherein the determining the location information for each of the plurality of data channels comprises generating location information for each channel to indicate a lowest slot index, a starting slot index, and a highest slot index used for the data channel.

13. The method of claim 12, wherein the determining the location information for each of the plurality of data channels further comprises mapping the lowest slot index, the starting slot index, and the highest slot index for each data channel to a code value based on a mapping scheme.

14. The method of claim 11, wherein the plurality of slots are assigned a plurality of slot indices, and wherein the determining the location information for each of the plurality of data channels further comprises generating location information for each data channel to indicate a lowest slot index and a highest slot index used for the data channel.

15. The method of claim 1, further comprising:
forming at least one overhead message for the overhead information for the plurality of data channels, each overhead message including at least one location record, and each location record including location information for an associated data channel.

16. The method of claim 15, wherein the plurality of data channels are assigned different identifiers, and wherein the forming the at least one overhead message comprises arranging the at least one location record for each overhead message in sequential order based on identifiers of at least one associated data channel.

17. The method of claim 15, wherein each location record has a fixed length.

18. The method of claim 1, wherein generating the composite and embedded overhead information comprises generating a first portion of overhead information with location information for data channels with a wide coverage area, and generating a second portion of overhead information with location information for data channels with a local coverage area.

19. The method of claim 18, wherein the transmitting the overhead information comprises transmitting the first and second portions of the overhead information in first and second time intervals, respectively.

20. The method of claim 18, further comprising:
processing the first portion of the overhead information in accordance with a first mode; and
processing the second portion of the overhead information in accordance with a second mode, wherein each of the first and second modes indicates a particular code rate and a particular modulation scheme to use for the overhead information.

21. An apparatus in a communication system, comprising:
a controller operative to determine location information for each of a plurality of data channels in super frames operating on a plurality of frequency bands, the location information for each data channel indicating time location, frequency location, or both time and frequency location where the data channel is transmitted, to generate composite overhead information including location information for each of the plurality of data channels in a current super-frame, and to generate embedded overhead information for each of the plurality of data channels including location information for each of the plurality of data channels in a future super-frame; and
a data processor operative to process the composite overhead information and the embedded overhead information for transmission in a time division multiplexed (TDM) manner with data for the plurality of data channels.

22. The apparatus of claim 21, further comprising:
a transmitter unit operable to transmit the plurality of data channels in super-frames, each super-frame having a predetermined time duration, and to further transmit the composite overhead information at the start of the current super-frame in a time division multiplexed (TDM) manner with the data for the plurality of data channels.

23. The apparatus of claim 22, wherein the transmitter unit is further operable to transmit the embedded overhead information with a payload for the corresponding data channel in the current super-frame.

24. The apparatus of claim 22, wherein the overhead information for transmission in each super-frame comprises location information for the plurality of data channels for the super-frame.

25. The apparatus of claim 22, wherein the controller is further operable to generate location information for each data channel for a current super-frame to indicate whether or not the data channel is to be transmitted in the current super-frame.

26. The apparatus of claim 22, wherein the controller is further operative, for each data channel to be transmitted in a current super-frame, to generate location information for the data channel to indicate a starting time in which the data channel is to be transmitted in the current super-frame.

27. The apparatus of claim 22, wherein the controller is further operative, for each data channel not to be transmitted in a current super-frame, to generate location information for the data channel to indicate a next earliest super-frame in which the data channel is to be potentially transmitted.

28. The apparatus of claim 22, wherein the controller is further operative to generate location information for each data channel for a current super-frame to indicate a length of each data packet to be sent on the data channel in the current super-frame.

29. The apparatus of claim 21, wherein the communication system is a wireless broadcast system utilizing orthogonal frequency division multiplexing (OFDM).

30. The apparatus of claim 21, wherein the controller is further operative to generate a first portion of overhead information with location information for data channels with a wide coverage area, and to generate a second portion of overhead information with location information for data channels with a local coverage area.

31. The apparatus of claim 30, wherein the controller is further operative to transmit the first and second portions of the overhead information in first and second time intervals, respectively.

32. The apparatus of claim 30, wherein the data processor is further operative to process the first portion of the overhead information in accordance with a first mode, and to process the second portion of the overhead information in accordance with a second mode, wherein each of the first and second modes indicates a particular code rate and a particular modulation scheme to be used for the overhead information.

33. The apparatus of claim 21, further comprising:
a transmitter unit operable to transmit at least one data stream on each of the plurality of data channels.

34. The apparatus of claim 33, wherein the location information for each data channel indicates the number of data streams transmitted on the data channel.

35. The apparatus of claim 33, wherein the location information for each data channel indicates size of each data stream being transmitted on the data channel.

36. The apparatus of claim 21, further comprising:
a transmitter unit operable to transmit the plurality of data channels in a plurality of slots, each slot being associated with a respective set of frequency subbands.

37. The apparatus of claim 36, wherein the plurality of slots are assignable to a plurality of slot indices, and wherein the controller is further operative to generate location information for each channel to indicate a lowest slot index, a starting slot index, and a highest slot index to be used for the data channel.

38. The apparatus of claim 37, wherein the controller is further operative to map the lowest slot index, the starting slot index, and the highest slot index for each data channel to a code value based on a mapping scheme.

39. The apparatus of claim 36, wherein the plurality of slots are assignable to a plurality of slot indices, and wherein the controller is further operative to generate location information for each data channel to indicate a lowest slot index and a highest slot index to be used for the data channel.

40. The apparatus of claim 21, wherein the controller is further operative to form at least one overhead message for the overhead information for the plurality of data channels, each overhead message including at least one location record, and each location record including location information for an associated data channel.

41. The apparatus of claim 40, wherein each location record has a fixed length.

42. The apparatus of claim 40, wherein the plurality of data channels are to be assigned different identifiers, and wherein the controller is further operative to arrange the at least one location record for each overhead message in sequential order based on identifiers of at least one associated data channel.

43. An apparatus in a communication system, comprising:
means for determining location information for each of a plurality of data channels, the location information for each data channel indicating time location, frequency location, or both time and frequency location where the data channel is transmitted;
means for generating composite overhead information, the composite overhead information including the location information for each of the plurality of data channels in a current super-frame;
means for generating embedded overhead information for each of the plurality of data channels, the embedded overhead information including location information for each of the plurality of data channels in a future super-frame;
means for transmitting the composite overhead information at the start of the current super-frame in a time division multiplexed (TDM) manner with data for the plurality of data channels; and
means for transmitting the embedded overhead information with a payload for the corresponding data channel in the current super-frame.

44. The apparatus of claim 43, further comprising:
means for transmitting the plurality of data channels in super-frames, each super-frame having a predetermined time duration.

45. The apparatus of claim 44, wherein the means for transmitting the overhead information in a TDM manner further comprises means for transmitting the overhead information in each super-frame in a TDM manner with the data for the plurality of data channels.

46. The apparatus of claim 45, wherein the overhead information for transmission in each super-frame comprises location information for the plurality of data channels for the super-frame.

47. The apparatus of claim 45, wherein the means for determining the location information for each of the plurality of data channels further comprises means for generating location information for each data channel for a current super-frame to indicate whether or not the data channel is to be transmitted in the current super-frame.

48. The apparatus of claim 45, wherein the means for determining the location information for each of the plurality of data channels further comprises, for each data channel transmitted in a current super-frame, means for generating location information for the data channel to indicate a starting time in which the data channel is to be transmitted in the current super-frame.

49. The apparatus of claim 45, wherein the means for determining the location information for each of the plurality of data channels further comprises, for each data channel not transmitted in a current super-frame, means for generating location information for the data channel to indicate a next earliest super-frame in which the data channel is to be potentially transmitted.

50. The apparatus of claim 45, wherein the means for determining the location information for each of the plurality of data channels further comprises means for generating location information for each data channel for a current super-frame to indicate a length of each data packet to be sent on the data channel in the current super-frame.

51. The apparatus of claim 43, further comprising:
means for transmitting at least one data stream on each of the plurality of data channels.

52. The apparatus of claim 51, wherein the location information for each data channel indicates the number of data streams transmitted on the data channel.

53. The apparatus of claim 51, wherein the location information for each data channel indicates size of each data stream being transmitted on the data channel.

54. The apparatus of claim 43, further comprising:
means for transmitting the plurality of data channels in a plurality of slots, each slot being associated with a respective set of frequency sub bands.

55. The apparatus of claim 54, wherein the plurality of slots are assigned a plurality of slot indices, and wherein the means for determining the location information for each of the plurality of data channels further comprises means for generating location information for each channel to indicate a lowest slot index, a starting slot index, and a highest slot index to be used for the data channel.

56. The apparatus of claim 55, wherein the means for determining the location information for each of the plurality of data channels further comprises means for mapping the lowest slot index, the starting slot index, and the highest slot index for each data channel to a code value based on a mapping scheme.

57. The apparatus of claim 54, wherein the plurality of slots are assignable to a plurality of slot indices, and wherein the means for determining the location information for each of the plurality of data channels further comprises means for generating location information for each data channel to indicate a lowest slot index and a highest slot index to be used for the data channel.

58. The apparatus of claim 43, wherein the means for generating the composite and embedded overhead information further comprises means for generating a first portion of overhead information with location information for data channels with a wide coverage area, and means for generating a second portion of overhead information with location information for data channels with a local coverage area.

59. The apparatus of claim 58, wherein the means for transmitting the overhead information further comprises means for transmitting the first and second portions of the overhead information in first and second time intervals, respectively.

60. The apparatus of claim 58, further comprising:
means for processing the first portion of the overhead information in accordance with a first mode; and
means for processing the second portion of the overhead information in accordance with a second mode, wherein each of the first and second modes indicates a particular code rate and a particular modulation scheme to be uses for the overhead information.

61. The apparatus of claim 43, further comprising:
means for forming at least one overhead message for the overhead information for the plurality of data channels, each overhead message including at least one location record, and each location record including location information for an associated data channel.

62. The apparatus of claim 61, wherein the plurality of data channels are to be assigned different identifiers, and wherein the means for forming the at least one overhead message further comprises means for arranging the at least one location record for each overhead message in sequential order based on identifiers of at least one associated data channel.

63. The apparatus of claim 61, wherein each location record has a fixed length.

64. A method of transmitting overhead information in a communication system, comprising:
transmitting a plurality of data channels in super-frames, each super-frame having a predetermined time duration, and each data channel carrying at least one data stream;
determining location information for data channels with a wide coverage area and for data channels with a local coverage area, and wherein for each of the plurality of data channels in super frames operating on a plurality of frequency bands, the location information for each data channel indicating time location, frequency location, or both time and frequency location where the data channel is transmitted in a future super-frame; and
transmitting the location information for each data channel along with data for the data channel in a current super-frame.

65. The method of claim 64, wherein the future super-frame is a next superframe immediately following the current super-frame.

66. The method of claim 64, wherein the future super-frame is more than one super-frame from the current super-frame.

67. The method of claim 64, wherein the determining the location information for each of the plurality of data channels comprises generating location information for each data channel to indicate whether or not the data channel is transmitted in the future super-frame.

68. The method of claim 64, wherein the determining the location information for each of the plurality of data channels comprises for each data channel to be transmitted in the future super-frame, generating location information for the data channel to indicate a starting time in which the data channel is transmitted in the future super-frame.

69. The method of claim 64, wherein the determining the location information for each of the plurality of data channels comprises for each data channel not transmitted in the future super-frame, generating location information for the data channel to indicate a next earliest super-frame in which the data channel is potentially transmitted.

70. The method of claim 64, wherein the transmitting the plurality of data channels comprises transmitting the plurality of data channels in a plurality of slots, each slot being associated with a particular set of frequency sub bands.

71. The method of claim 70, wherein the plurality of slots are assigned a plurality of slot indices, and wherein the determining the location information for each of the plurality of data channels comprises for each data channel to be transmitted in the future superframe, generating location information for the data channel to indicate a lowest slot index, a starting slot index, and a highest slot index used for the data channel in the future super-frame.

72. The method of claim 64, wherein the determining the location information for each of the plurality of data channels comprises for each data channel to be transmitted in the future super-frame, generating location information for the data channel to indicate a length of each data packet to be sent on the data channel in the future super-frame.

73. An apparatus in a communication system, comprising:
a transmitter unit operable to transmit a plurality of data channels in super-frames operating on a plurality of frequency bands in super-frames, each super-frame having a predetermined time duration, and each data channel carrying at least one data stream;
a controller operative to determine location information for data channels with a wide coverage area and for data channels with a local coverage area, and wherein for each of the plurality of data channels, the location information for each data channel indicating time location, frequency location, or both time and frequency location where the data channel is transmitted in a future super-frame; and
a data processor operative to process the location information for each data channel for transmission along with data for the data channel in a current super-frame.

74. The apparatus of claim 73, wherein the future super-frame is a next super-frame immediately following the current super-frame.

75. The apparatus of claim 73, wherein the future super-frame is more than one super-frame from the current super-frame.

76. The apparatus of claim 73, wherein the controller is further operative to generate location information for each data channel to indicate whether or not the data channel is to be transmitted in the future super-frame.

77. The apparatus of claim 73, wherein the controller is further operative, for each data channel to be transmitted in the future super-frame, to generate location information for the data channel to indicate a starting time in which the data channel is to be transmitted in the future super-frame.

78. The apparatus of claim 73, wherein the controller is further operative, for each data channel not transmitted in the future super-frame, to generate location information for the data channel to indicate a next earliest super-frame in which the data channel is to potentially be transmitted.

79. The apparatus of claim 73, wherein the controller is further operative to transmit the plurality of data channels in a plurality of slots, each slot being associated with a particular set of frequency subbands.

80. The apparatus of claim 79, wherein the plurality of slots are assignable to a plurality of slot indices, and wherein the controller is further operative, for each data channel to be transmitted in the future super-frame, to generate location information for the data channel to indicate a lowest slot index, a starting slot index, and a highest slot index to be used for the data channel in the future super-frame.

81. The apparatus of claim 73, wherein the controller is further operative, for each data channel to be transmitted in the future super-frame, to generate location information for the data channel to indicate a length of each data packet to be sent on the data channel in the future super-frame.

82. An apparatus in a communication system, comprising: means for transmitting a plurality of data channels in super frames operating on a plurality of frequency bands in super-frames, each super-frame having a predetermined time duration, and each data channel carrying at least one data stream;
  means for determining location information for data channels with a wide coverage area and for data channels with a local coverage area, and wherein for each of the plurality of data channels, the location information for each data channel indicating time location, frequency location, or both time and frequency location where the data channel is transmitted in a future super-frame; and
  means for transmitting the location information for each data channel along with data for the data channel in a current super-frame.

83. The apparatus of claim 82, wherein the future super-frame is a next super-frame immediately following the current super-frame.

84. The apparatus of claim 82, wherein the future super-frame is more than one super-frame from the current super-frame.

85. The apparatus of claim 82, wherein the means for determining the location information for each of the plurality of data channels further comprises means for generating location information for each data channel to indicate whether or not the data channel is to be transmitted in the future super-frame.

86. The apparatus of claim 82, wherein the means for determining the location information for each of the plurality of data channels further comprises, for each data channel to be transmitted in the future super-frame, means for generating location information for the data channel to indicate a starting time in which the data channel is to be transmitted in the future super-frame.

87. The apparatus of claim 82, wherein the means for determining the location information for each of the plurality of data channels further comprises, for each data channel not transmitted in the future super-frame, means for generating location information for the data channel to indicate a next earliest super-frame in which the data channel is to potentially be transmitted.

88. The apparatus of claim 82, wherein the means for transmitting the plurality of data channels further comprises means for transmitting the plurality of data channels in a plurality of slots, each slot being associated with a particular set of frequency subbands.

89. The apparatus of claim 88, wherein the plurality of slots are assignable to a plurality of slot indices, and wherein the means for determining the location information for each of the plurality of data channels further comprises, for each data channel to be transmitted in the future super-frame, means for generating location information for the data channel to indicate a lowest slot index, a starting slot index, and a highest slot index to be used for the data channel in the future super-frame.

90. The apparatus of claim 82, wherein the means for determining the location information for each of the plurality of data channels further comprises, for each data channel to be transmitted in the future super-frame, means for generating location information for the data channel to indicate a length of each data packet to be sent on the data channel in the future super-frame.

91. A method of receiving data in a communication system, comprising:
  receiving overhead information for a plurality of data channels in super frames operating on a plurality of frequency bands transmitted in super-frames, each super-frame having a predetermined time duration, wherein the overhead information for a current super-frame is transmitted in a time division multiplexed (TDM) manner with data sent in the current superframe for the plurality of data channels, and wherein the overhead information comprises location information for data channels with a wide coverage area and location information for data channels with a local coverage area;
  obtaining first location information for a selected data channel from the overhead information received in the current super-frame, the first location information indicating time location, frequency location, or both time and frequency location where the selected data channel is transmitted in the current super-frame; and
  receiving the selected data channel in the current super-frame based on the first location information.

92. The method of claim 91, further comprising:
  processing the selected data channel to obtain second location information for the selected data channel, second the location information being transmitted along with data for the selected data channel in the current super-frame and indicating time location, frequency location, or both time and frequency location where the selected data channel is transmitted in a future super-frame; and
  receiving the selected data channel in the future super-frame based on the second location information.

93. An apparatus in a communication system, comprising:
  a controller operative to receive overhead information, the overhead information comprises location information for data channels with a wide coverage area and for data channels with a local coverage area, and for a plurality of data channels in super frames operating on a plurality of frequency bands transmitted in super-frames, and to obtain first location information for a selected data channel from the overhead information received in a current super-frame, each super-frame having a predetermined time duration, the overhead information for the current super-frame being transmitted in a time division multiplexed (TDM) manner with data sent in the current super-frame for the plurality of data channels, and the first location information indicating time location, frequency location, or both time and frequency location where the selected data channel is transmitted in the current super-frame;
  a data processor operative to receive the selected data channel in the current super-frame based on the first location information; and
  wherein the data processor is further operable to process the selected data channel to obtain second location information for the selected data channel, the second location information being transmitted along with data for the selected data channel in the current super-frame and indicating time location, frequency location, or both time and frequency location where the selected data channel is transmitted in a future super-frame, and wherein the data processor is further operative to receive the selected data channel in the future super-frame based on the second location information.

94. An apparatus in a communication system, comprising:
means for receiving overhead information for a plurality of data channels in super frames operating on a plurality of frequency bands transmitted in super-frames, each super-frame having a predetermined time duration, wherein the overhead information for a current super-frame is transmitted in a time division multiplexed (TDM) manner with data sent in the current superframe for the plurality of data channels, and wherein the overhead information comprises location information for data channels with a wide coverage area and location information for data channels with a local coverage area;
means for obtaining first location information for a selected data channel from the overhead information received in the current super-frame, the first location information indicating time location, frequency location, or both time and frequency location where the selected data channel is transmitted in the current super-frame;
means for receiving the selected data channel in the current super-frame based on the first location information;
means for processing the selected data channel to obtain second location information for the selected data channel, the second location information being transmitted along with data for the selected data channel in the current super-frame and indicating time location, frequency location, or both time and frequency location where the selected data channel is transmitted in a future super-frame; and
means for receiving the selected data channel in the future super-frame based on the second location information.

95. A non-transitory computer-readable medium comprising executable instructions, the executable instructions comprising code for transmitting overhead information in a communication system, the code comprising:
determining location information for each of a plurality of data channels in super frames operating on a plurality of frequency bands, the location information for each data channel indicating time location, frequency location, or both time and frequency location where the data channel is transmitted;
generating composite overhead information, the composite overhead information including the location information for each of the plurality of data channels in a current superframe generating embedded overhead information for each of the plurality of data channels, the embedded overhead information including location information for each of the plurality of data channels in a future super-frame;
transmitting the composite overhead information at the start of the current super-frame in a time division multiplexed (TDM) manner with data for the plurality of data channels; and
transmitting the embedded overhead information with a payload for the corresponding data channel in the current super-frame.

96. The non-transitory computer-readable medium of claim 95, the code further comprising:
transmitting at least one data stream on each of the plurality of data channels.

97. The non-transitory computer-readable medium of claim 96, wherein the location information for each data channel indicates the number of data streams to be transmitted on the data channel.

98. The non-transitory computer-readable medium of claim 96, wherein the location information for each data channel indicates size of each data stream being transmitted on the data channel.

99. The non-transitory computer-readable medium of claim 95, the code further comprising:
transmitting the plurality of data channels in super-frames, each super-frame having a predetermined time duration; and
transmitting the overhead information in each super-frame in a TDM manner with the data for the plurality of data channels.

100. The non-transitory computer-readable medium of claim 99, wherein the overhead information to be transmitted in each super-frame comprises location information for the plurality of data channels for the super-frame.

101. The non-transitory computer-readable medium of claim 99, the code further comprising generating location information for each data channel for a current super-frame to indicate whether or not the data channel is to be transmitted in the current superframe.

102. The non-transitory computer-readable medium of claim 99, the code further comprising, for each data channel transmitted in a current super-frame, generating location information for the data channel to indicate a starting time in which the data channel is to be transmitted in the current super-frame.

103. The non-transitory computer-readable medium of claim 99, the code further comprising, for each data channel not transmitted in a current super-frame, generating location information for the data channel to indicate a next earliest super-frame in which the data channel is to be potentially transmitted.

104. The non-transitory computer-readable medium of claim 99, the code further comprising generating location information for each data channel for a current super-frame to indicate a length of each data packet being sent on the data channel in the current super-frame.

105. The non-transitory computer-readable medium of claim 95, the code further comprising:
transmitting the plurality of data channels in a plurality of slots, each slot being associated with a respective set of frequency sub bands.

106. The non-transitory computer-readable medium of claim 105, wherein the plurality of slots are assigned a plurality of slot indices, and the code further comprising generating location information for each channel to indicate a lowest slot index, a starting slot index, and a highest slot index to be used for the data channel.

107. The non-transitory computer-readable medium of claim 106, the code further comprising mapping the lowest slot index, the starting slot index, and the highest slot index for each data channel to a code value based on a mapping scheme.

108. The non-transitory computer-readable medium of claim 105, wherein the plurality of slots are assignable to a plurality of slot indices, and the code further comprising generating location information for each data channel to indicate a lowest slot index and a highest slot index used for the data channel.

109. The non-transitory computer-readable medium of claim 95, the code further comprising generating a first portion of overhead information with location information for data channels with a wide coverage area, and generating a second portion of overhead information with location information for data channels with a local coverage area.

110. The non-transitory computer-readable medium of claim 109, the code further comprising transmitting the first and second portions of the overhead information in first and second time intervals, respectively.

111. The non-transitory computer-readable medium of claim 109, the code further comprising:
processing the first portion of the overhead information in accordance with a first mode; and
processing the second portion of the overhead information in accordance with a second mode, wherein each of the first and second modes indicates a particular code rate and a particular modulation scheme to be used for the overhead information.

112. The non-transitory computer-readable medium of claim 95, the code further comprising:
forming at least one overhead message for the overhead information for the plurality of data channels, each overhead message including at least one location record, and each location record including location information for an associated data channel.

113. The non-transitory computer-readable medium of claim 112, wherein the plurality of data channels are to be assigned different identifiers, and the code further comprising arranging the at least one location record for each overhead message in sequential order based on identifiers of at least one associated data channel.

114. The non-transitory computer-readable medium of claim 112, wherein each location record has a fixed length.

115. A non-transitory computer-readable medium comprising executable instructions, the executable instructions comprising code for transmitting overhead information in a communication system, the code comprising:
transmitting a plurality of data channels in super-frames, each super-frame having a predetermined time duration, and each data channel carrying at least one data stream;
determining location information for data channels with a wide coverage area and for data channels with a local coverage area, and wherein for each of the plurality of data channels in super frames operating on a plurality of frequency bands, the location information for each data channel indicating time location, frequency location, or both time and frequency location where the data channel is transmitted in a future super-frame; and
transmitting the location information for each data channel along with data for the data channel in a current super-frame.

116. The non-transitory computer-readable medium of claim 115, wherein the future super-frame is a next super-frame immediately following the current super-frame.

117. The non-transitory computer-readable medium of claim 115, wherein the future super-frame is more than one super-frame from the current super-frame.

118. The non-transitory computer-readable medium of claim 115, the code further comprising generating location information for each data channel to indicate whether or not the data channel is to be transmitted in the future super-frame.

119. The non-transitory computer-readable medium of claim 115, the code further comprising, for each data channel to be transmitted in the future superframe, generating location information for the data channel to indicate a starting time in which the data channel is to be transmitted in the future super-frame.

120. The non-transitory computer-readable medium of claim 115, the code further comprising, for each data channel not transmitted in the future super-frame, generating location information for the data channel to indicate a next earliest super-frame in which the data channel is to potentially be transmitted.

121. The non-transitory computer-readable medium of claim 115, the code further comprising transmitting the plurality of data channels in a plurality of slots, each slot being associated with a particular set of frequency sub bands.

122. The non-transitory computer-readable medium of claim 121, wherein the plurality of slots are assignable to a plurality of slot indices, and the code further comprising, for each data channel to be transmitted in the future super-frame, generating location information for the data channel to indicate a lowest slot index, a starting slot index, and a highest slot index to be used for the data channel in the future super-frame.

123. The non-transitory computer-readable medium of claim 115, the code further comprising, for each data channel to be transmitted in the future superframe, generating location information for the data channel to indicate a length of each data packet to be sent on the data channel in the future super-frame.

124. A non-transitory computer-readable medium comprising executable instructions, the executable instructions comprising code for receiving data in a communication system, the code comprising:
receiving overhead information for a plurality of data channels in super frames operating on a plurality of frequency bands transmitted in super-frames, each super-frame having a predetermined time duration, wherein the overhead information for a current super-frame is transmitted in a time division multiplexed (TDM) manner with data sent in the current superframe for the plurality of data channels, and wherein the overhead information comprises location information for data channels with a wide coverage area and location information for data channels with a local coverage area;
obtaining first location information for a selected data channel from the overhead information received in the current super-frame, the first location information indicating time location, frequency location, or both time and frequency location where the selected data channel is transmitted in the current super-frame;
receiving the selected data channel in the current super-frame based on the first location information;
processing the selected data channel to obtain second location information for the selected data channel, the second location information being transmitted along with data for the selected data channel in the current super-frame and indicating time location, frequency location, or both time and frequency location where the selected data channel is transmitted in a future super-frame; and
receiving the selected data channel in the future super-frame based on the second location information.

125. A method of transmitting overhead information in a communication system, comprising:
determining location information for each of a plurality of data channels in a plurality of frames operating on one or more frequency bands, the location information for each data channel indicating time location, frequency location, or both time and frequency location where the data channel is transmitted;
generating composite overhead information, the composite overhead information including the location information for each of the plurality of data channels in a current frame;
generating embedded overhead information for each of the plurality of data channels, the embedded overhead information including location information for each of the plurality of data channels in a future frame;

transmitting the composite overhead information at the start of the current frame in a time division multiplexed (TDM) manner with data for the plurality of data channels; and transmitting the embedded overhead information with a payload for the corresponding data channel in the current frame.

126. An apparatus in a communication system, comprising:

a controller operative to determine location information for each of a plurality of data channels in a plurality of frames operating on one or more frequency bands, the location information for each data channel indicating time location, frequency location, or both time and frequency location where the data channel is transmitted, to generate composite overhead information including location information for each of the plurality of data channels in a current frame, and to generate embedded overhead information for each of the plurality of data channels including location information for each of the plurality of data channels in a future frame; and a data processor operative to process the composite overhead information and the embedded overhead information for transmission in a time division multiplexed (TDM) manner with data for the plurality of data channels.

127. An apparatus in a communication system, comprising:

means for determining location information for each of a plurality of data channels, the location information for each data channel indicating time location, frequency location, or both time and frequency location where the data channel is transmitted;

means for generating composite overhead information, the composite overhead information including the location information for each of the plurality of data channels in a current frame;

means for generating embedded overhead information for each of the plurality of data channels, the embedded overhead information including location information for each of the plurality of data channels in a future frame;

means for transmitting the composite overhead information at the start of the current frame in a time division multiplexed (TDM) manner with data for the plurality of data channels; and means for transmitting the embedded overhead information with a payload for the corresponding data channel in the current frame.

128. A method of transmitting overhead information in a communication system, comprising:

transmitting a plurality of data channels in a plurality of frames, each frame having a predetermined time duration, and each data channel carrying at least one data stream;

determining location information for data channels with a wide coverage area and for data channels with a local coverage area, and wherein for each of the plurality of data channels in the plurality of frames operating on one or more frequency bands, the location information for each data channel indicating time location, frequency location, or both time and frequency location where the data channel is transmitted in a future frame; and transmitting the location information for each data channel along with data for the data channel in a current frame.

129. An apparatus in a communication system, comprising:

a transmitter unit operable to transmit a plurality of data channels in a plurality of frames operating on one or more frequency bands in the plurality of frames, each frame having a predetermined time duration, and each data channel carrying at least one data stream;

a controller operative to determine location information for data channels with a wide coverage area and for data channels with a local coverage area, and wherein for each of the plurality of data channels, the location information for each data channel indicating time location, frequency location, or both time and frequency location where the data channel is transmitted in a future frame; and a data processor operative to process the location information for each data channel for transmission along with data for the data channel in a current frame.

130. An apparatus in a communication system, comprising:

means for transmitting a plurality of data channels in a plurality of frames operating on one or more frequency bands in the plurality of frames, each frame having a predetermined time duration, and each data channel carrying at least one data stream;

means for determining location information for data channels with a wide coverage area and for data channels with a local coverage area, and wherein for each of the plurality of data channels, the location information for each data channel indicating time location, frequency location, or both time and frequency location where the data channel is transmitted in a future frame; and means for transmitting the location information for each data channel along with data for the data channel in a current frame.

131. A method of receiving data in a communication system, comprising:

receiving overhead information for a plurality of data channels in a plurality of frames operating on one or more frequency bands transmitted in the plurality of frames, each frame having a predetermined time duration, wherein the overhead information for a current frame is transmitted in a time division multiplexed (TDM) manner with data sent in the current frame for the plurality of data channels, and wherein the overhead information comprises location information for data channels with a wide coverage area and location information for data channels with a local coverage area;

obtaining first location information for a selected data channel from the overhead information received in the current frame, the first location information indicating time location, frequency location, or both time and frequency location where the selected data channel is transmitted in the current frame; and receiving the selected data channel in the current frame based on the first location information.

132. An apparatus in a communication system, comprising:

a controller operative to receive overhead information, the overhead information comprises location information for data channels with a wide coverage area and for data channels with a local coverage area, and for a plurality of data channels in a plurality of frames operating on one or more frequency bands transmitted in the plurality of frames, and to obtain first location information for a selected data channel from the overhead information received in a current frame, each frame having a predetermined time duration, the overhead information for the current frame being transmitted in a time division multiplexed (TDM) manner with data sent in the current frame for the plurality of data channels, and the first location information indicating time location, frequency location, or both time and frequency location where the selected data channel is transmitted in the current frame;

a data processor operative to receive the selected data channel in the current frame based on the first location information; and wherein the data processor is further operable to process the selected data channel to obtain second location information for the selected data channel, the second location information being transmitted along with data for the selected data channel in the current frame and indicating time location, frequency location, or both time and frequency location where the selected data channel is transmitted in a future frame, and wherein the data processor is further operative to receive the selected data channel in the future frame based on the second location information.

133. An apparatus in a communication system, comprising:

means for receiving overhead information for a plurality of data channels in a plurality of frames operating on one or more frequency bands transmitted in the plurality of frames, each frame having a predetermined time duration, wherein the overhead information for a current frame is transmitted in a time division multiplexed (TDM) manner with data sent in the current frame for the plurality of data channels, and wherein the overhead information comprises location information for data channels with a wide coverage area and location information for data channels with a local coverage area;

means for obtaining first location information for a selected data channel from the overhead information received in the current frame, the first location information indicating time location, frequency location, or both time and frequency location where the selected data channel is transmitted in the current frame;

means for receiving the selected data channel in the current frame based on the first location information;

means for processing the selected data channel to obtain second location information for the selected data channel, the second location information being transmitted along with data for the selected data channel in the current frame and indicating time location, frequency location, or both time and frequency location where the selected data channel is transmitted in a future frame; and means for receiving the selected data channel in the future frame based on the second location information.

134. A non-transitory computer-readable medium comprising executable instructions, the executable instructions comprising code for transmitting overhead information in a communication system, the code comprising:

determining location information for each of a plurality of data channels in a plurality of frames operating on one or more frequency bands, the location information for each data channel indicating time location, frequency location, or both time and frequency location where the data channel is transmitted;

generating composite overhead information, the composite overhead information including the location information for each of the plurality of data channels in a current frame generating embedded overhead information for each of the plurality of data channels, the embedded overhead information including location information for each of the plurality of data channels in a future frame;

transmitting the composite overhead information at the start of the current frame in a time division multiplexed (TDM) manner with data for the plurality of data channels; and transmitting the embedded overhead information with a payload for the corresponding data channel in the current frame.

135. A non-transitory computer-readable medium comprising executable instructions, the executable instructions comprising code for transmitting overhead information in a communication system, the code comprising:

transmitting a plurality of data channels in a plurality of frames, each frame having a predetermined time duration, and each data channel carrying at least one data stream;

determining location information for data channels with a wide coverage area and for data channels with a local coverage area, and wherein for each of the plurality of data channels in the plurality of frames operating on one or more frequency bands, the location information for each data channel indicating time location, frequency location, or both time and frequency location where the data channel is transmitted in a future frame; and transmitting the location information for each data channel along with data for the data channel in a current frame.

136. A non-transitory computer-readable medium comprising executable instructions, the executable instructions comprising code for receiving data in a communication system, the code comprising:

receiving overhead information for a plurality of data channels in a plurality of frames operating on one or more frequency bands transmitted in the plurality of frames, each frame having a predetermined time duration, wherein the overhead information for a current frame is transmitted in a time division multiplexed (TDM) manner with data sent in the current frame for the plurality of data channels, and wherein the overhead information comprises location information for data channels with a wide coverage area and location information for data channels with a local coverage area;

obtaining first location information for a selected data channel from the overhead information received in the current frame, the first location information indicating time location, frequency location, or both time and frequency location where the selected data channel is transmitted in the current frame;

receiving the selected data channel in the current frame based on the first location information;

processing the selected data channel to obtain second location information for the selected data channel, the second location information being transmitted along with data for the selected data channel in the current frame and indicating time location, frequency location, or both time and frequency location where the selected data channel is transmitted in a future frame; and receiving the selected data channel in the future frame based on the second location information.

137. A method of transmitting overhead information in a communication system, comprising:

generating embedded overhead information for each of a plurality of data channels, the embedded overhead information including location information for each of the plurality of data channels in a future super-frame; and transmitting the embedded overhead information with a payload for the corresponding data channel in the current super-frame.

138. The method of claim 137, further comprising:
transmitting at least one data stream on each of the plurality of data channels.

139. The method of claim 138, wherein the location information for each data channel indicates the number of data streams transmitted on the data channel.

140. The method of claim 138, wherein the location information for each data channel indicates size of each data stream being transmitted on the data channel.

141. The method of claim 137, further comprising:
transmitting the plurality of data channels in super-frames, each super-frame having a predetermined time duration, and transmitting the embedded overhead information in each super-frame in a TDM manner with the data for the plurality of data channels.

142. The method of claim 141, wherein the embedded overhead information transmitted in each super-frame comprises location information for the plurality of data channels for the superframe.

143. The method of claim 141, further comprising generating location information for each data channel for a current super-frame to indicate whether or not the data channel is transmitted in the current super-frame.

144. The method of claim 141, further comprising for each data channel transmitted in a current super-frame, generating location information for the data channel to indicate a starting time in which the data channel is transmitted in the current super-frame.

145. The method of claim 141, further including for each data channel not transmitted in a current super-frame, generating location information for the data channel to indicate a next earliest super-frame in which the data channel is potentially transmitted.

146. The method of claim 137, further comprising:
transmitting the plurality of data channels in a plurality of slots, each slot being associated with a respective set of frequency sub bands.

147. The method of claim 146, wherein the plurality of slots are assigned a plurality of slot indices, and generating location information for each channel to indicate a lowest slot index, a starting slot index, and a highest slot index used for the data channel.

148. The method of claim 147, further comprising mapping the lowest slot index, the starting slot index, and the highest slot index for each data channel to a code value based on a mapping scheme.

149. The method of claim 146, wherein the plurality of slots are assigned a plurality of slot indices, and generating location information for each data channel to indicate a lowest slot index and a highest slot index used for the data channel.

150. The method of claim 141, further comprising generating location information for each data channel for a current super-frame to indicate a length of each data packet being sent on the data channel in the current super-frame.

151. The method of claim 137, wherein generating the embedded overhead information comprises generating a first portion of overhead information with location information for data channels with a wide coverage area, and generating a second portion of overhead information with location information for data channels with a local coverage area.

152. The method of claim 151, wherein the transmitting the embedded overhead information comprises transmitting the first and second portions of the embedded overhead information in first and second time intervals, respectively.

153. The method of claim 151, further comprising:
processing the first portion of the embedded overhead information in accordance with a first mode; and
processing the second portion of the embedded overhead information in accordance with a second mode, wherein each of the first and second modes indicates a particular code rate and a particular modulation scheme to use for the embedded overhead information.

154. The method of claim 137, further comprising:
forming at least one overhead message for the embedded overhead information for the plurality of data channels, each overhead message including at least one location record, and each location record including location information for an associated data channel.

155. The method of claim 154, wherein the plurality of data channels are assigned different identifiers, and wherein the forming the at least one overhead message comprises arranging the at least one location record for each overhead message in sequential order based on identifiers of at least one associated data channel.

156. The method of claim 154, wherein each location record has a fixed length.

157. An apparatus in a communication system, comprising:
a controller operative to generate embedded overhead information for each of a plurality of data channels including location information for each of the plurality of data channels in a future super-frame; and
a data processor operative to process the embedded overhead information for transmission in a time division multiplexed (TDM) manner with data for the plurality of data channels.

158. The apparatus of claim 157, further comprising:
a transmitter unit operable to transmit the plurality of data channels in super-frames, each super-frame having a predetermined time duration, and to further transmit the embedded overhead information at the start of the current super-frame in a time division multiplexed (TDM) manner with the data for the plurality of data channels.

159. The apparatus of claim 158, wherein the transmitter unit is further operable to transmit the embedded overhead information with a payload for the corresponding data channel in the current super-frame.

160. The apparatus of claim 157, wherein the communication system is a wireless broadcast system utilizing orthogonal frequency division multiplexing (OFDM).

161. The apparatus of claim 137, wherein the controller is further operative to generate a first portion of overhead information with location information for data channels with a wide coverage area, and to generate a second portion of overhead information with location information for data channels with a local coverage area.

162. The apparatus of claim 157, further comprising:
a transmitter unit operable to transmit at least one data stream on each of the plurality of data channels.

163. The apparatus of claim 162, wherein the location information for each data channel indicates the number of data streams transmitted on the data channel.

164. The apparatus of claim 162, wherein the location information for each data channel indicates size of each data stream being transmitted on the data channel.

165. The apparatus of claim 163, wherein the embedded overhead information for transmission in each super-frame comprises location information for the plurality of data channels for the super-frame.

166. The apparatus of claim 158, wherein the controller is further operable to generate location information for each data channel for a current super-frame to indicate whether or not the data channel is to be transmitted in the current super-frame.

167. The apparatus of claim 158, wherein the controller is further operative, for each data channel to be transmitted in a current super-frame, to generate location information for the data channel to indicate a starting time in which the data channel is to be transmitted in the current super-frame.

168. The apparatus of claim 158, wherein the controller is further operative, for each data channel not to be transmitted in a current super-frame, to generate location information for the data channel to indicate a next earliest super-frame in which the data channel is to be potentially transmitted.

169. The apparatus of claim 157, further comprising:
a transmitter unit operable to transmit the plurality of data channels in a plurality of slots, each slot being associated with a respective set of frequency subbands.

170. The apparatus of claim 169, wherein the plurality of slots are assignable to a plurality of slot indices, and wherein the controller is further operative to generate location information for each channel to indicate a lowest slot index, a starting slot index, and a highest slot index to be used for the data channel.

171. The apparatus of claim 170, wherein the controller is further operative to map the lowest slot index, the starting slot index, and the highest slot index for each data channel to a code value based on a mapping scheme.

172. The apparatus of claim 169, wherein the plurality of slots are assignable to a plurality of slot indices, and wherein the controller is further operative to generate location information for each data channel to indicate a lowest slot index and a highest slot index to be used for the data channel.

173. The apparatus of claim 158, wherein the controller is further operative to generate location information for each data channel for a current super-frame to indicate a length of each data packet to be sent on the data channel in the current super-frame.

174. The apparatus of claim 161, wherein the controller is further operative to transmit the first and second portions of the overhead information in first and second time intervals, respectively.

175. The apparatus of claim 161, wherein the data processor is further operative to process the first portion of the overhead information in accordance with a first mode, and to process the second portion of the overhead information in accordance with a second mode, wherein each of the first and second modes indicates a particular code rate and a particular modulation scheme to be used for the overhead information.

176. The apparatus of claim 157, wherein the controller is further operative to form at least one overhead message for the embedded overhead information for the plurality of data channels, each overhead message including at least one location record, and each location record including location information for an associated data channel.

177. The apparatus of claim 176, wherein the plurality of data channels are to be assigned different identifiers, and wherein the controller is further operative to arrange the at least one location record for each overhead message in sequential order based on identifiers of at least one associated data channel.

178. The apparatus of claim 176, wherein each location record has a fixed length.

179. An apparatus in a communication system, comprising:

means for generating embedded overhead information for each of a plurality of data channels, the embedded overhead information including location information for each of the plurality of data channels in a future super-frame;
means for transmitting the embedded overhead information with a payload for the corresponding data channel in the current super-frame.

180. The apparatus of claim 179, further comprising:
means for transmitting the plurality of data channels in super-frames, each super-frame having a predetermined time duration.

181. The apparatus of claim 179, further comprising:
means for transmitting at least one data stream on each of the plurality of data channels.

182. The apparatus of claim 181, wherein the location information for each data channel indicates the number of data streams transmitted on the data channel.

183. The apparatus of claim 181, wherein the location information for each data channel indicates size of each data stream being transmitted on the data channel.

184. The apparatus of claim 180, further comprising means for transmitting overhead information in each super-frame in a TDM manner with the data for the plurality of data channels.

185. The apparatus of claim 184, wherein the overhead information for transmission in each super-frame comprises location information for the plurality of data channels for the super-frame.

186. The apparatus of claim 184, further comprising means for generating location information for each data channel for a current super-frame to indicate whether or not the data channel is to be transmitted in the current super-frame.

187. The apparatus of claim 184, further comprising for each data channel transmitted in a current super-frame, means for generating location information for the data channel to indicate a starting time in which the data channel is to be transmitted in the current super-frame.

188. The apparatus of claim 184, further comprising for each data channel not transmitted in a current super-frame, means for generating location information for the data channel to indicate a next earliest super-frame in which the data channel is to be potentially transmitted.

189. The apparatus of claim 179, further comprising:
means for transmitting the plurality of data channels in a plurality of slots, each slot being associated with a respective set of frequency sub bands.

190. The apparatus of claim 189, wherein the plurality of slots are assigned a plurality of slot indices, and further comprising means for generating location information for each channel to indicate a lowest slot index, a starting slot index, and a highest slot index to be used for the data channel.

191. The apparatus of claim 190, further comprising means for mapping the lowest slot index, the starting slot index, and the highest slot index for each data channel to a code value based on a mapping scheme.

192. The apparatus of claim 191, wherein the plurality of slots are assignable to a plurality of slot indices, and further comprising means for generating location information for each data channel to indicate a lowest slot index and a highest slot index to be used for the data channel.

193. The apparatus of claim 184, further comprising means for generating location information for each data channel for a current super-frame to indicate a length of each data packet to be sent on the data channel in the current super-frame.

194. The apparatus of claim 179, wherein the means for generating the embedded overhead information further comprises means for generating a first portion of overhead information with location information for data channels with a wide coverage area, and means for generating a second portion of overhead information with location information for data channels with a local coverage area.

195. The apparatus of claim 194, wherein the means for transmitting the embedded overhead information further comprises means for transmitting the first and second portions of the overhead information in first and second time intervals, respectively.

196. The apparatus of claim 194, further comprising:
means for processing the first portion of the embedded overhead information in accordance with a first mode; and
means for processing the second portion of the embedded overhead information in accordance with a second mode, wherein each of the first and second modes indicates a particular code rate and a particular modulation scheme to be used for the embedded overhead information.

197. The apparatus of claim 194, further comprising:
means for forming at least one overhead message for the embedded overhead information for the plurality of data channels, each overhead message including at least one location record, and each location record including location information for an associated data channel.

198. The apparatus of claim 197, wherein the plurality of data channels are to be assigned different identifiers, and wherein the means for forming the at least one overhead message further comprises means for arranging the at least one location record for each overhead message in sequential order based on identifiers of at least one associated data channel.

199. The apparatus of claim 197, wherein each location record has a fixed length.

200. A non-transitory computer-readable medium comprising executable instructions, the executable instructions comprising code for transmitting overhead information in a communication system, the code comprising:
generating embedded overhead information for each of a plurality of data channels, the embedded overhead information including location information for each of the plurality of data channels in a future super-frame;
transmitting the embedded overhead information with a payload for the corresponding data channel in the current super-frame.

201. The non-transitory computer-readable medium of claim 200, the code further comprising:
transmitting at least one data stream on each of the plurality of data channels.

202. The non-transitory computer-readable medium of claim 201, wherein the location information for each data channel indicates the number of data streams to be transmitted on the data channel.

203. The non-transitory computer-readable medium of claim 201, wherein the location information for each data channel indicates size of each data stream being transmitted on the data channel.

204. The non-transitory computer-readable medium of claim 200, the code further comprising:
transmitting the plurality of data channels in super-frames, each super-frame having a predetermined time duration.

205. The non-transitory computer-readable medium of claim 204, wherein the overhead information to be transmitted in each super-frame comprises location information for the plurality of data channels for the super-frame.

206. The non-transitory computer-readable medium of claim 204, the code further comprising generating location information for each data channel for a current super-frame to indicate whether or not the data channel is to be transmitted in the current superframe.

207. The non-transitory computer-readable medium of claim 204, the code further comprising, for each data channel transmitted in a current super-frame, generating location information for the data channel to indicate a starting time in which the data channel is to be transmitted in the current super-frame.

208. The non-transitory computer-readable medium of claim 204, the code further comprising, for each data channel not transmitted in a current super-frame, generating location information for the data channel to indicate a next earliest super-frame in which the data channel is to be potentially transmitted.

209. The non-transitory computer-readable medium of claim 200, the code further comprising:
transmitting the plurality of data channels in a plurality of slots, each slot being associated with a respective set of frequency sub bands.

210. The non-transitory computer-readable medium of claim 209, wherein the plurality of slots are assigned a plurality of slot indices, and the code further comprising generating location information for each channel to indicate a lowest slot index, a starting slot index, and a highest slot index to be used for the data channel.

211. The non-transitory computer-readable medium of claim 210, the code further comprising mapping the lowest slot index, the starting slot index, and the highest slot index for each data channel to a code value based on a mapping scheme.

212. The non-transitory computer-readable medium of claim 209, wherein the plurality of slots are assignable to a plurality of slot indices, and the code further comprising generating location information for each data channel to indicate a lowest slot index and a highest slot index used for the data channel.

213. The non-transitory computer-readable medium of claim 204, the code further comprising generating location information for each data channel for a current super-frame to indicate a length of each data packet being sent on the data channel in the current super-frame.

214. The non-transitory computer-readable medium of claim 200, the code further comprising generating a first portion of overhead information with location information for data channels with a wide coverage area, and generating a second portion of overhead information with location information for data channels with a local coverage area.

215. The non-transitory computer-readable medium of claim 214, the code further comprising transmitting the first and second portions of the overhead information in first and second time intervals, respectively.

216. The non-transitory computer-readable medium of claim 214, the code further comprising:
processing the first portion of the overhead information in accordance with a first mode; and
processing the second portion of the overhead information in accordance with a second mode, wherein each of the first and second modes indicates a particular code rate and a particular modulation scheme to be used for the embedded overhead information.

217. The non-transitory computer-readable medium of claim 200, the code further comprising:
forming at least one overhead message for the embedded overhead information for the plurality of data channels, each overhead message including at least one location record, and each location record including location information for an associated data channel.

218. The non-transitory computer-readable medium of claim 217, wherein the plurality of data channels are to be assigned different identifiers, and the code further comprising arranging the at least one location record for each overhead message in sequential order based on identifiers of at least one associated data channel.

219. The non-transitory computer-readable medium of claim 217, wherein each location record has a fixed length.

220. A method of transmitting overhead information in a communication system, comprising:
  generating embedded overhead information for each of a plurality of data channels, the embedded overhead information including location information for each of the plurality of data channels in a future frame;
  transmitting the embedded overhead information with a payload for the corresponding data channel in the current frame.

221. An apparatus in a communication system, comprising:
  a controller operative to generate embedded overhead information for each of a plurality of data channels including location information for each of the plurality of data channels in a future frame; and
  a data processor operative to process the embedded overhead information for transmission in a time division multiplexed (TDM) manner with data for the plurality of data channels.

222. An apparatus in a communication system, comprising:
  means for generating embedded overhead information for each of a plurality of data channels, the embedded overhead information including location information for each of the plurality of data channels in a future frame;
  means for transmitting the embedded overhead information with a payload for the corresponding data channel in the current frame.

* * * * *